US012633994B2

(12) United States Patent
Bai et al.

(10) Patent No.:     US 12,633,994 B2
(45) Date of Patent:       May 19, 2026

(54) MEASUREMENT AND SCHEDULING OF INTRA-FREQUENCY AND INTER-FREQUENCY REFERENCE SIGNALS

(71) Applicant: QUALCOMM Incorporated, San Diego, CA (US)

(72) Inventors: Tianyang Bai, Mountain View, CA (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 18/494,531

(22) Filed:     Oct. 25, 2023

(65)               Prior Publication Data

US 2024/0154682 A1      May 9, 2024

Related U.S. Application Data

(60) Provisional application No. 63/423,026, filed on Nov. 6, 2022.

(51) Int. Cl.
    *H04B 7/06*        (2006.01)
    *H04W 72/56*      (2023.01)
(52) U.S. Cl.
    CPC ........ *H04B 7/06964* (2023.05); *H04W 72/56* (2023.01)
(58) Field of Classification Search
    CPC ... H04L 5/0048; H04L 5/0035; H04L 5/0051; H04L 5/0091; H04B 7/06964; H04B 7/024; H04B 7/022; H04W 24/04; H04W 72/56
    See application file for complete search history.

(56)                References Cited

U.S. PATENT DOCUMENTS

2020/0351674 A1*  11/2020  Zhou ..................... H04W 72/21
2021/0014022 A1    1/2021  Yang
                   (Continued)

FOREIGN PATENT DOCUMENTS

EP        3793243 A1     3/2021
EP        4270809 A1    11/2023
                (Continued)

OTHER PUBLICATIONS

English translation of WO 2022139394 A1 (Year: 2022).*
                (Continued)

*Primary Examiner* — Sophia Vlahos
(74) *Attorney, Agent, or Firm* — QUALCOMM Incorporated

(57)               ABSTRACT

Aspects relate to measuring and scheduling reference signals. A user equipment (UE) detects reference signals having overlapping resources, and determines a context associated with the reference signals. A Layer 1 (L1) measurement is then performed of at least one reference signal according to a prioritization associated with the context. In another aspect, a network entity determines a scheduling of resources that enables a UE to prioritize performing an L1 measurement of a reference signal from a non-serving cell, and communicates with the UE according to the scheduling. In yet another aspect, a UE communicates with a gNb using transmission configuration indication (TCI) states associated with a corresponding control resource set (CORESET) pool of CORESETs. Beam failure detection (BFD) reference signals are then identified explicitly via a configuration signaling, or implicitly based on the TCI states. The BFD reference signals are then monitored to facilitate detecting a beam failure event.

28 Claims, 17 Drawing Sheets

(56) References Cited

U.S. PATENT DOCUMENTS

| 2022/0046691 | A1* | 2/2022 | Kim ...................... H04L 5/0055 |
|---|---|---|---|
| 2023/0106244 | A1* | 4/2023 | Yu ........................ H04L 5/0048 |
| | | | 370/329 |
| 2023/0345568 | A1* | 10/2023 | Go ........................ H04W 76/19 |
| 2024/0007371 | A1* | 1/2024 | Jin ...................... H04L 43/0811 |
| 2024/0008052 | A1 | 1/2024 | Matsumura et al. |
| 2024/0080147 | A1* | 3/2024 | Li ....................... H04B 7/06952 |
| 2024/0089943 | A1* | 3/2024 | Yu ........................ H04L 1/1854 |
| 2024/0098826 | A1* | 3/2024 | Awada ................. H04W 76/19 |
| 2024/0414734 | A1* | 12/2024 | Matsumura .......... H04L 5/0094 |

FOREIGN PATENT DOCUMENTS

| WO | 2022097619 | A1 | 5/2022 |
|---|---|---|---|
| WO | 2022139394 | A1 | 6/2022 |
| WO | 2022204846 | A1 | 10/2022 |
| WO | 2022226767 | A1 | 11/2022 |

OTHER PUBLICATIONS

Huawei, et al., "Discussion on RRM maintaining issues for R17 inter-cell beam managements", 3GPP TSG-RAN WG4 Meeting #103-e, R4-2209007, Electronic Meeting, May 9-20, 2022, Apr. 25, 2022, 2 Pages, p. 1.

International Search Report and Written Opinion—PCT/US2023/077876—ISA/EPO—May 10, 2024.

Apple Inc: "Discussion on RRM Requirements for LI/L2 Centric Mobility and Unified TCI", 3GPP TSG-RAN WG4 Meeting # 100-e, R4-2112109, 3rd Generation Partnership Project, Mobile Competence Centre, 650, Route Des Lucioles, F-06921 Sophia-Antipolis Cedex, France, vol. RAN WG4, No. Electronic Meeting, Aug. 16, 2021-Aug. 27, 2021, Aug. 6, 2021, XP052038911, 9 pages, section "2.2.1 L1-RSRP Measurements".

Partial International Search Report—PCT/US2023/077876—ISA/EPO—Feb. 19, 2024.

* cited by examiner

Figure 14:
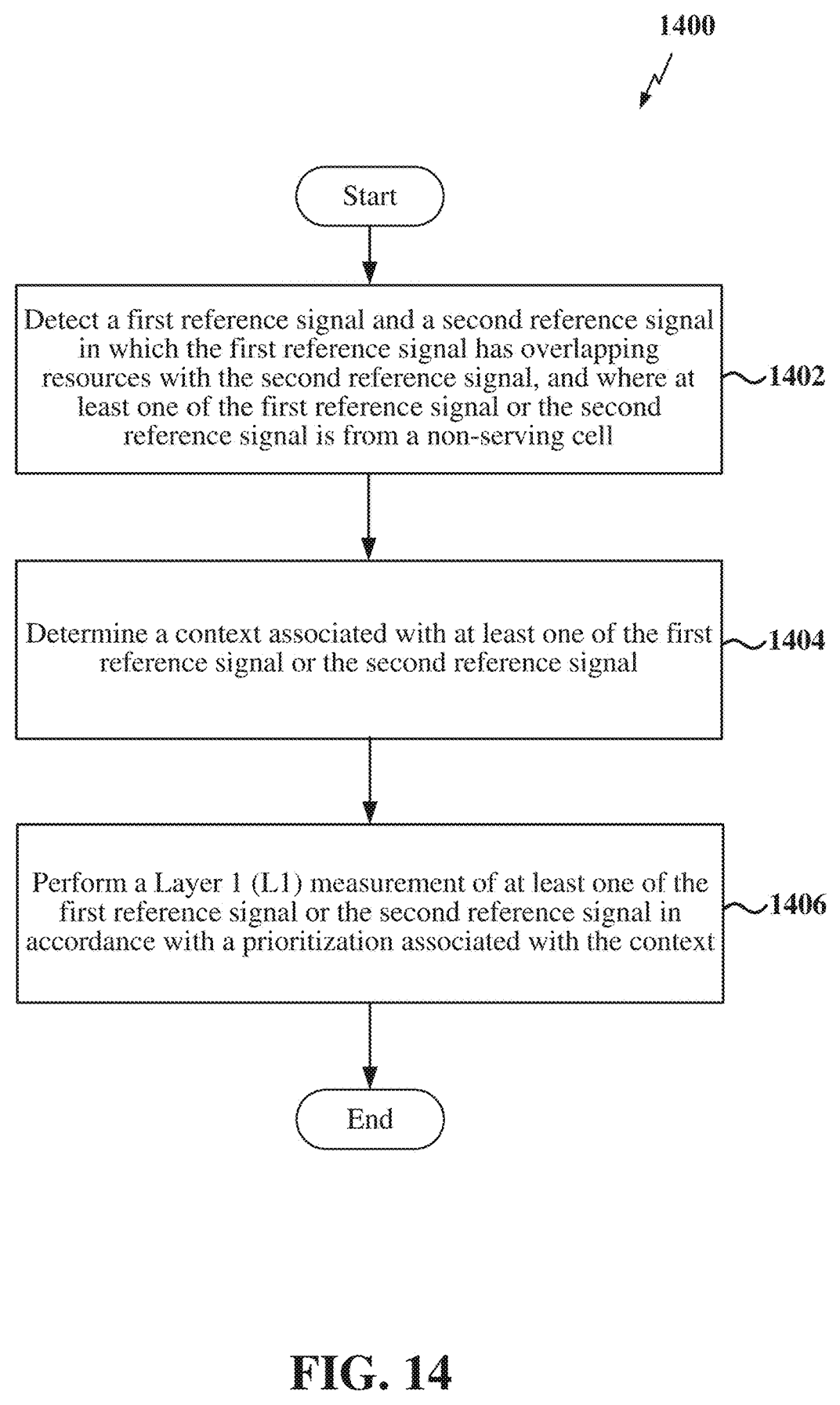

1400

Start

Detect a first reference signal and a second reference signal in which the first reference signal has overlapping resources with the second reference signal, and where at least one of the first reference signal or the second reference signal is from a non-serving cell ~1402

Determine a context associated with at least one of the first reference signal or the second reference signal ~1404

Perform a Layer 1 (L1) measurement of at least one of the first reference signal or the second reference signal in accordance with a prioritization associated with the context ~1406

End

Figure 15:
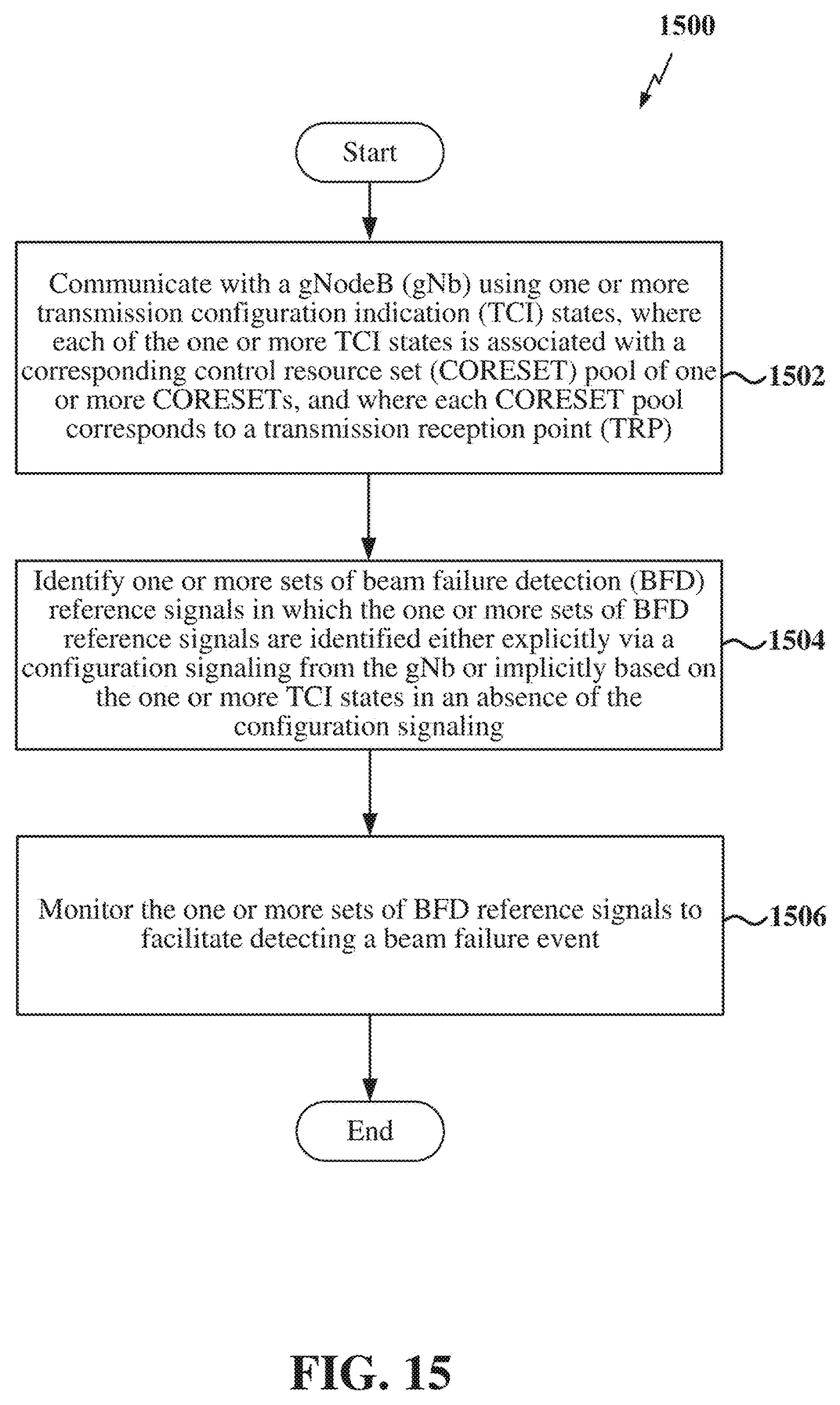

Start

Communicate with a gNodeB (gNb) using one or more transmission configuration indication (TCI) states, where each of the one or more TCI states is associated with a corresponding control resource set (CORESET) pool of one or more CORESETs, and where each CORESET pool corresponds to a transmission reception point (TRP) ∼1502

Identify one or more sets of beam failure detection (BFD) reference signals in which the one or more sets of BFD reference signals are identified either explicitly via a configuration signaling from the gNb or implicitly based on the one or more TCI states in an absence of the configuration signaling ∼1504

Monitor the one or more sets of BFD reference signals to facilitate detecting a beam failure event ∼1506

End

Start

Determine a scheduling associated with a configuration of resources in which the configuration of resources enables a user equipment (UE) to prioritize performing a Layer 1 (L1) measurement of a reference signal from a non-serving cell ~1702

Communicate with the UE in accordance with the scheduling ~1704

End

MEASUREMENT AND SCHEDULING OF INTRA-FREQUENCY AND INTER-FREQUENCY REFERENCE SIGNALS

CROSS-REFERENCE TO RELATED APPLICATIONS

This application claims priority to and the benefit of U.S. Provisional Patent Application No. 63/423,026, filed on Nov. 6, 2022, the entire content of which is hereby incorporated by reference.

TECHNICAL FIELD

The technology discussed below relates generally to wireless communication and, more particularly, to the measurement and scheduling of intra-frequency and inter-frequency reference signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to a first example, a user equipment (UE) is disclosed that includes a transceiver, a memory, and a processor coupled to the transceiver and the memory. The processor is configured to detect a first reference signal and a second reference signal in which the first reference signal has overlapping resources with the second reference signal, and where at least one of the first reference signal or the second reference signal is from a non-serving cell. The processor is further configured to determine a context associated with at least one of the first reference signal or the second reference signal, and to perform a Layer 1 (L1) measurement of at least one of the first reference signal or the second reference signal in accordance with a prioritization associated with the context.

In other examples, a method of wireless communication in a UE is disclosed. The method includes detecting a first reference signal and a second reference signal in which the first reference signal has overlapping resources with the second reference signal, and where at least one of the first reference signal or the second reference signal is from a non-serving cell. The method further includes determining a context associated with at least one of the first reference signal or the second reference signal, and performing an L1 measurement of at least one of the first reference signal or the second reference signal in accordance with a prioritization associated with the context.

Another example provides a network entity configured for wireless communication. The network entity includes a memory, and a processor coupled to the memory. The processor is configured to determine a scheduling associated with a configuration of resources in which the configuration of resources enables a UE to prioritize performing an L1 measurement of a reference signal from a non-serving cell. The processor is further configured to communicate with the UE in accordance with the scheduling.

According to yet another example, a UE is disclosed that includes a transceiver, a memory, and a processor coupled to the transceiver and the memory. The processor is configured to communicate with a gNodeB (gNb) using one or more transmission configuration indication (TCI) states, where each of the one or more TCI states is associated with a corresponding control resource set (CORESET) pool of one or more CORESETs, and where each CORESET pool corresponds to a transmission reception point (TRP). The processor is further configured to identify one or more sets of beam failure detection (BFD) reference signals in which the one or more sets of BFD reference signals are identified either explicitly via a configuration signaling from the gNb or implicitly based on the one or more TCI states in an absence of the configuration signaling. The processor is also configured to monitor the one or more sets of BFD reference signals to facilitate detecting a beam failure event.

These and other aspects of the disclosure will become more fully understood upon a review of the detailed description, which follows. Other aspects, features, and examples of the present disclosure will become apparent to those of ordinary skill in the art, upon reviewing the following description of specific examples of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while examples may be discussed below as device, system, or method examples it should be understood that such examples can be implemented in various devices, systems, and methods.

BRIEF DESCRIPTION OF THE DRAWINGS

FIG. 14 is a flow chart illustrating a first example of a method for communication in a UE according to some aspects.

FIG. 15 is a flow chart illustrating a second example of a method for communication in a UE according to some aspects.

DETAILED DESCRIPTION

Figure 1:
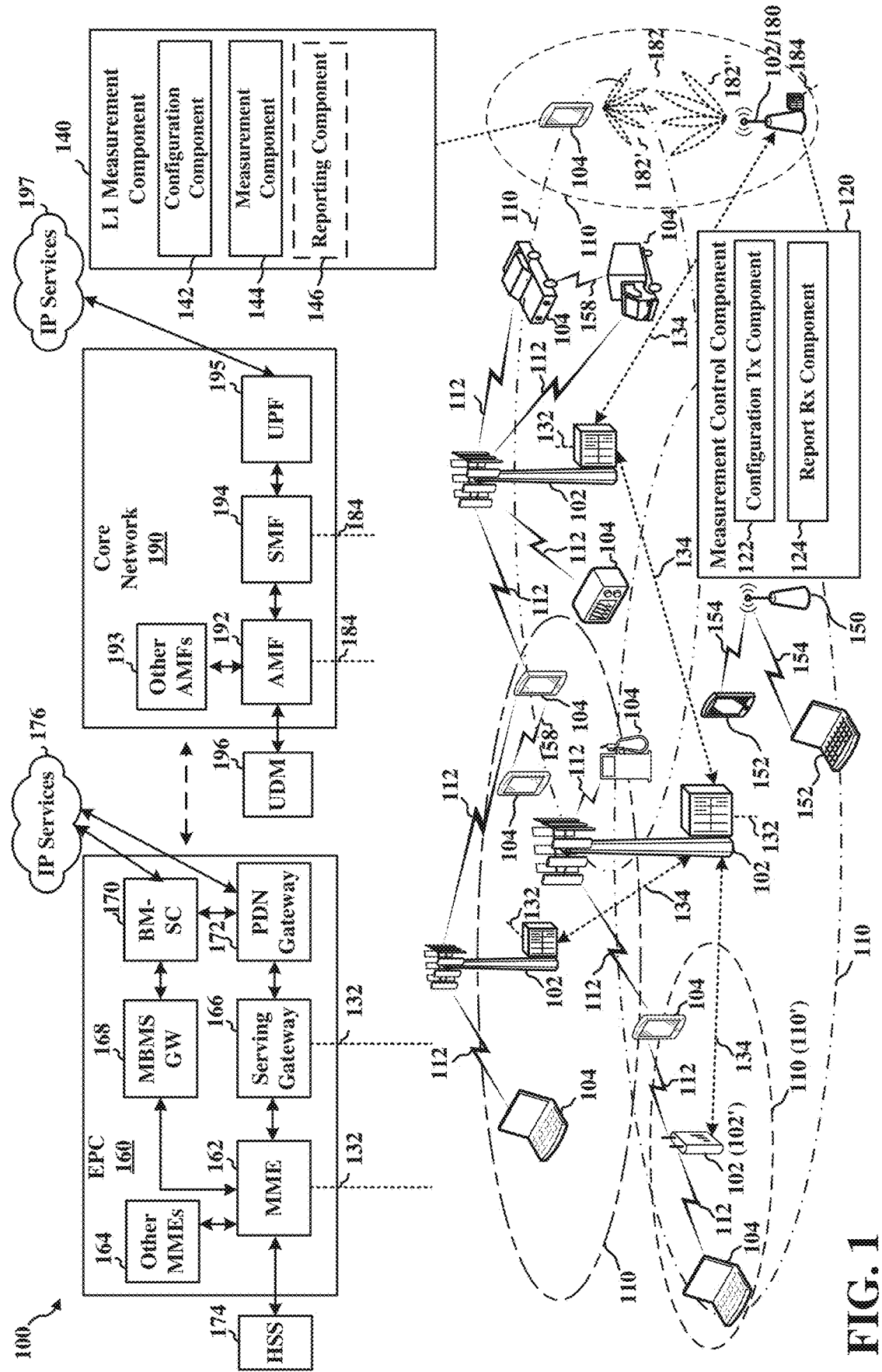
FIG. 1 is a diagram illustrating an example of a wireless communications system including an access network.

The detailed description set forth below is directed to certain implementations for the purpose of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Conventionally, in a wireless communications network such as a 5G NR network, mobility procedures are performed at layer 3 (L3) using radio resource control (RRC) messaging. Mobility procedures allow a user equipment (UE) to move from a source cell to a target cell. The mobility procedures may be based on layer 3 measurements of candidate cells. For example, a UE may be configured to measure candidate cells and transmit a measurement report in response to various conditions. In some scenarios, L3 mobility procedures may involve an interruption or gap in communications as the UE establishes an RRC connection with the target cell. Mobility procedures at layer 1 or layer 2 (L1/L2) offer the possibility of improving the speed of mobility over L3 mobility procedures. L1 and L2, however, offer less flexibility in terms of types and content of messages that may be transmitted. Additionally, L1 measurements may require different definitions of intra-frequency and inter-frequency measurements for the UE to be able to correctly configure and perform the L1 measurements.

The present disclosure provides for L1 measurements that may be used in L1/L2 mobility. In contrast to an L3 configuration of measurement objects or a measurement report, the L1 measurements may be configured as channel state information (CSI) reference signal (RS) measurement resources. Although 3GPP TS Release 17 may allow configuration of a CSI-RS measurement resource for an intra-frequency cell, such measurements are too limited for L1/L2 mobility. In a particular aspect disclosed herein, a UE detects a first and second reference signal having overlapping resources, wherein at least one of the reference signals is from a non-serving cell, and wherein the UE performs an L1 measurement of at least one of the reference signals in accordance with a prioritization associated with a context determined by the UE. In another aspect disclosed herein, a network entity (e.g., a gNb) determines a scheduling associated with a configuration of resources that enables a UE to prioritize performing an L1 measurement of a reference signal from a non-serving cell. In yet another aspect disclosed herein, a UE is configured to identify beam failure detection (BFD) reference signals implicitly based on TCI states in an absence of configuration signaling from a network.

Particular implementations of the subject matter described in this disclosure can be implemented to realize one or more of the following potential advantages. L1/L2 mobility procedures may improve the latency of mobility, thereby reducing interruption in communications during mobility. The use of CSI-RS measurement resources may provide flexibility in configuring measurements of both intra-frequency and inter-frequency candidate cells. L1/L2 mobility may use less signaling overhead than other mobility procedures.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the UEs 104 may include a L1 measurement component 140 that measures L1 channel characteristics. The L1 measurement component 140 may include configuration component 142 configured to receive, from a current serving cell, a configuration of a channel state information (CSI) reference signal (RS) measurement resource for layer 1 (L1) measurements of a candidate cell. The L1 measurement component 140 may include a measurement component 144 configured to measure a signal transmitted from the candidate cell based on whether the candidate cell is an intra-frequency candidate cell or an inter-frequency candidate cell. In some implementations, the L1 measurement component may optionally include a reporting component 146 configured to transmit a L1 CSI report including measurements of the candidate cell.

In some implementations, one or more of the base stations 102 may include a measurement control component 120 configured to manage a L1 measurements for a UE. The measurement control component 120 may include a configuration Tx component 122 configured to transmit, from a current serving cell, a configuration of a channel state information (CSI) reference signal (RS) measurement resource for layer 1 (L1) measurements of a candidate cell. The configuration is based on whether the candidate cell is an intra-frequency candidate cell or an inter-frequency candidate cell. The measurement control component 120 may include a report Rx component 124 configured to receive a L1 CSI report including measurements of the candidate cell.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as Si interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figures 2A, 2B, 2C, 2D:
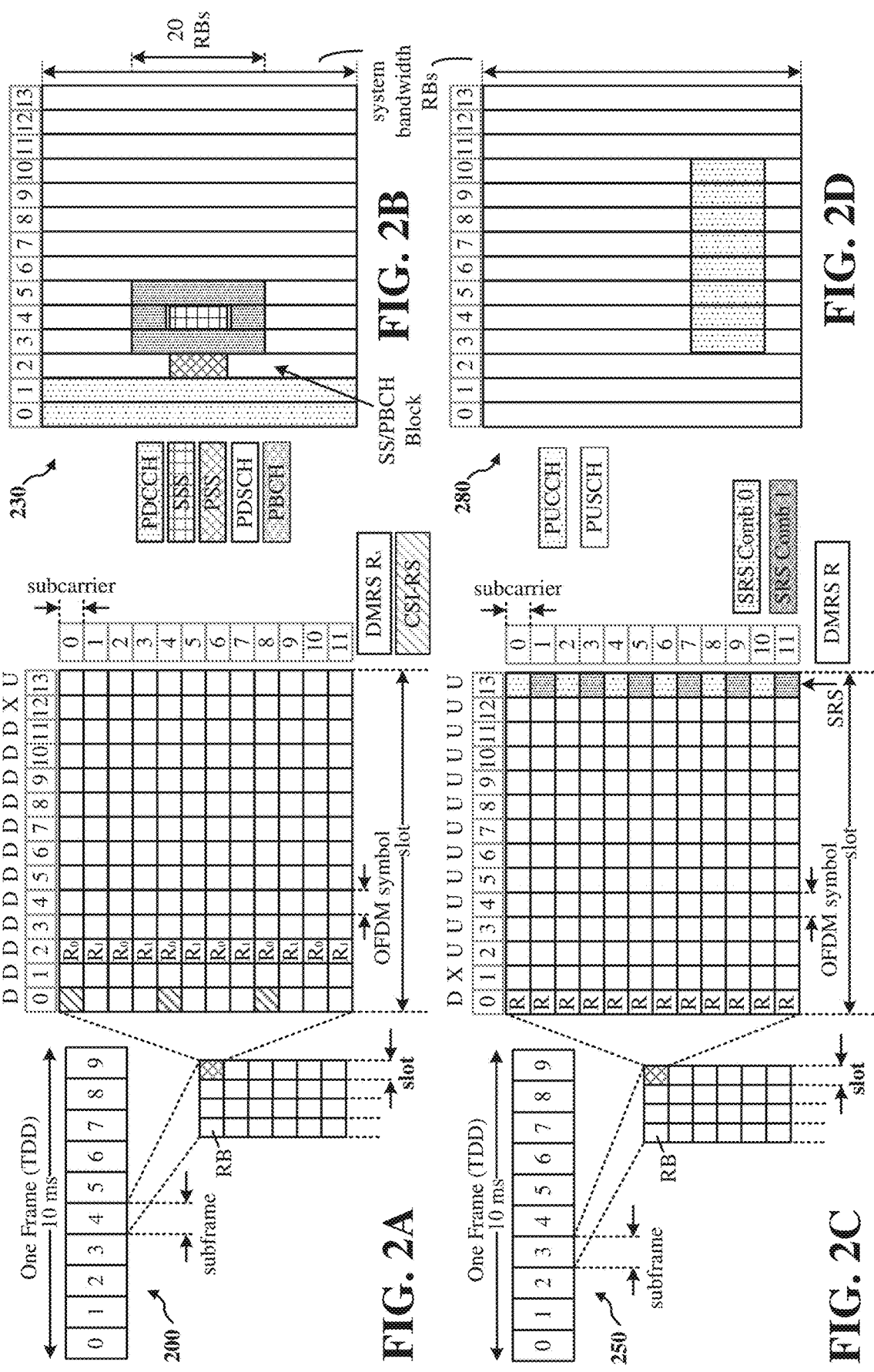
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a subframe.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one. In an aspect, a narrow bandwidth part (NBWP) refers to a BWP having a bandwidth less than or equal to a maximum configurable bandwidth of a BWP. The bandwidth of the NBWP is less than the carrier system bandwidth.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a L1 identity. A secondary synchronization signal (SSS) may be within symbol 4 of particular subframes of a frame. The SSS is used by a UE to determine a L1 cell identity group number and radio frame timing. Based on the L1 identity and the L1 cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
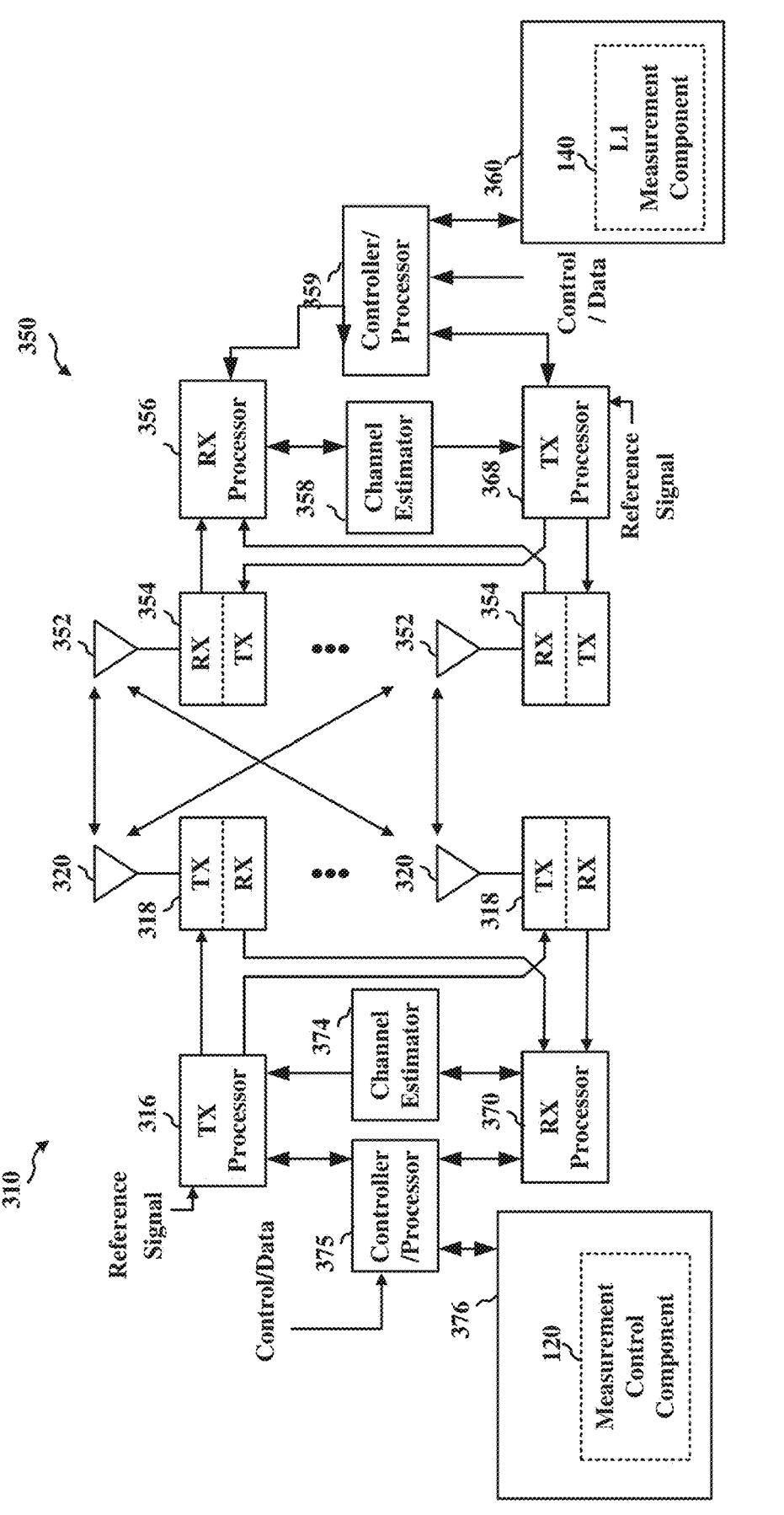
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIB s), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the L1 measurement component 140 of FIG. 1. For example, the memory 360 may include executable instructions defining the L1 measurement component 140. The TX processor 368, the RX processor 356, and/or the controller/processor 359 may be configured to execute the L1 measurement component 140.

At least one of the TX processor 316, the RX processor 370, and the controller/processor 375 may be configured to perform aspects in connection with the measurement control component 120 of FIG. 1. For example, the memory 376 may include executable instructions defining the measurement control component 120. The TX processor 316, the RX processor 370, and/or the controller/processor 375 may be configured to execute the measurement control component 120.

Figure 4:
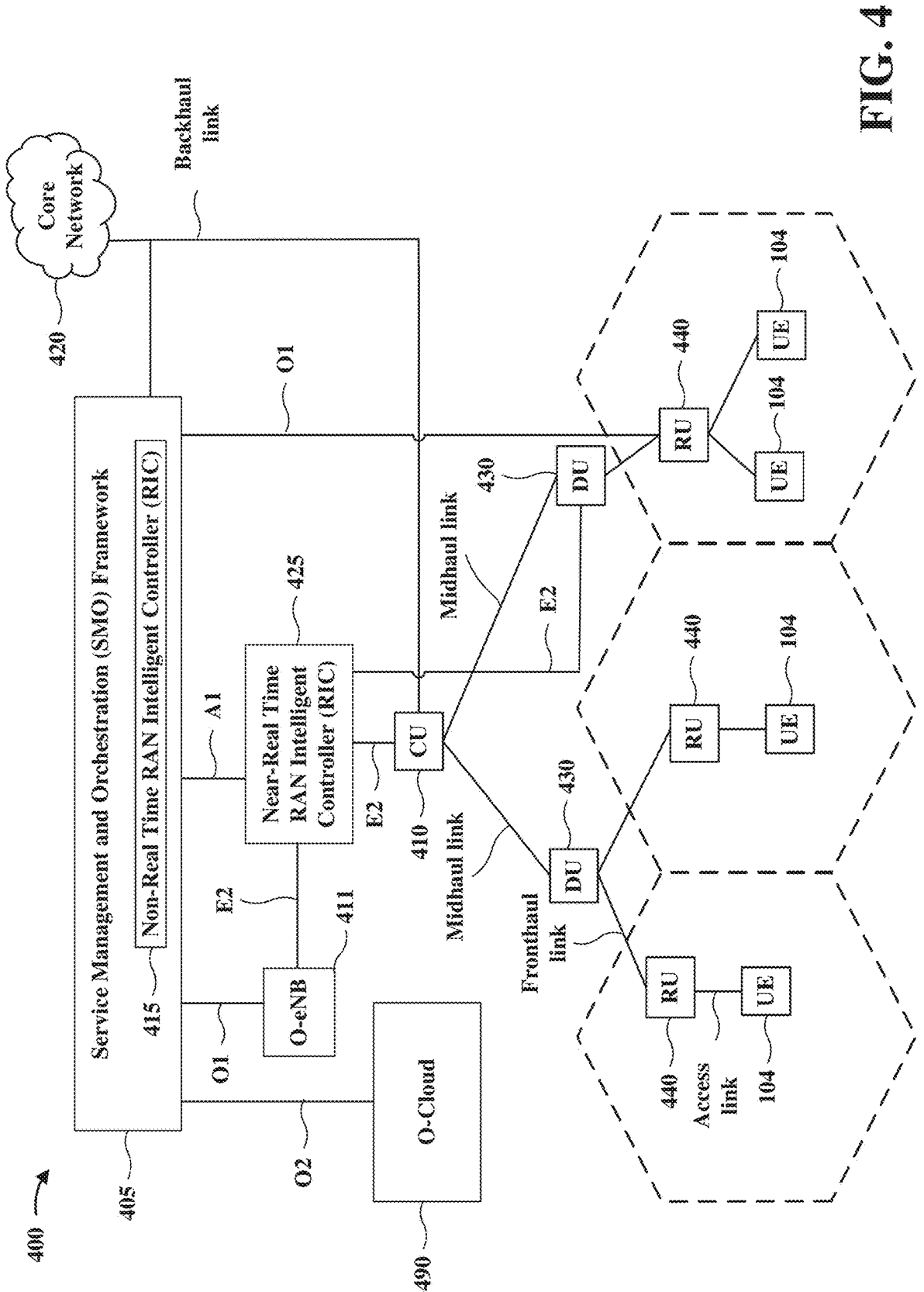
FIG. 4 is a diagram illustrating an example disaggregated base station architecture.

FIG. 4 is a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3 rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
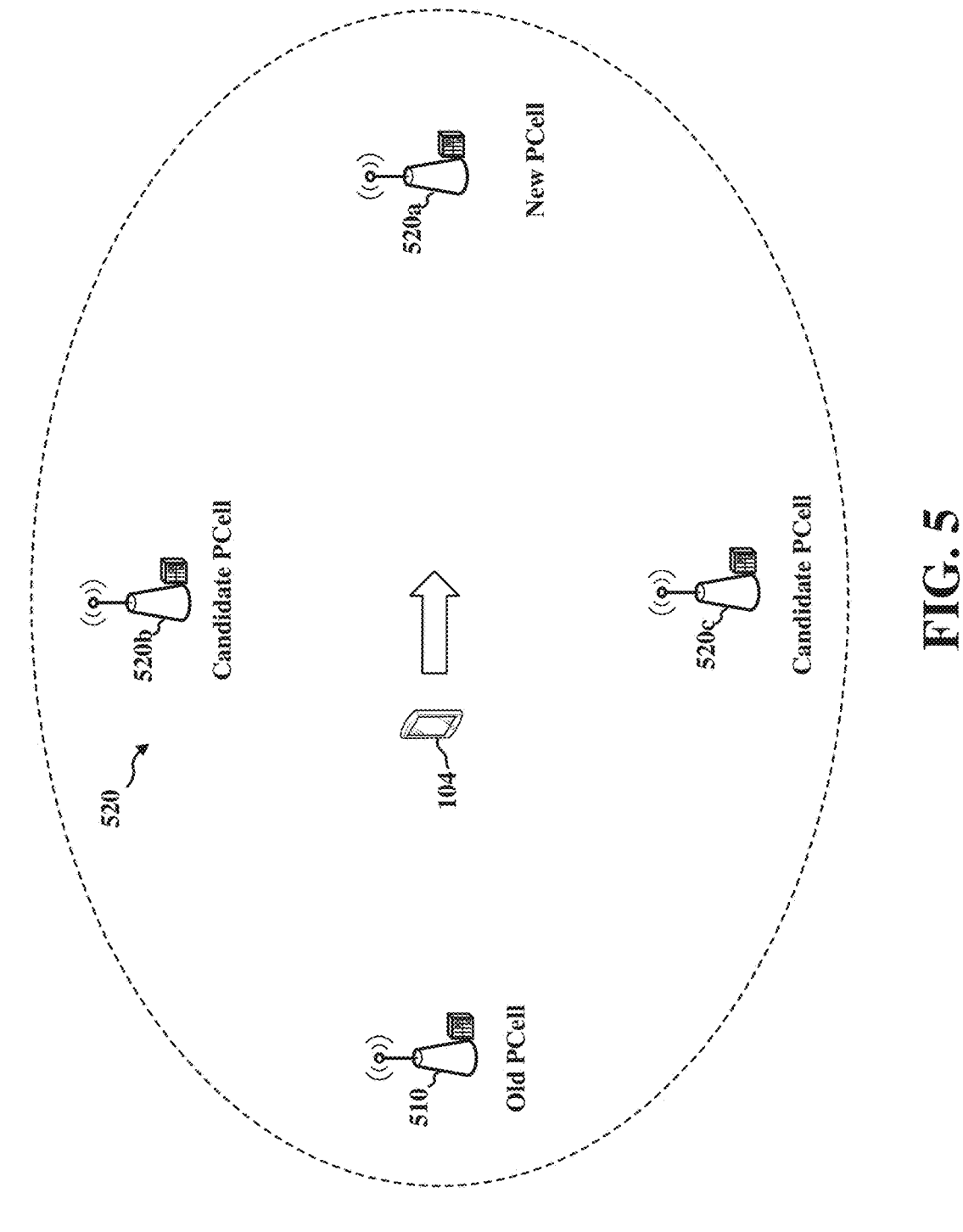
FIG. 5 is a diagram illustrating an example of a layer 1 or layer 2 (L1/L2) mobility scenario for primary cells (PCells).

FIG. 5 is a diagram illustrating an example of a L1/L2 mobility scenario 500 for primary cells (PCells). A UE 104 may initially be served by an active PCell 510. L1/L2 mobility may allow the PCell to be updated via L1/L2 signaling based on L1 measurements. The scenario 500 may apply to a single PCell change without carrier aggregation (CA). L1/L2 mobility may apply to both intra-frequency mobility and inter-frequency mobility.

During a L1/L2 mobility procedure, the UE 104 may determine a target candidate cell (e.g., new PCell 520a) from a set of candidate cells 520. For example, the set of candidate cells 520 may include candidate PCells 520a, 520b, and 520c. The target candidate PCell 520a may be selected based on, for example, L1 measurement.

Figure 6:
FIG. 6 is a diagram illustrating an example of a L1/L2 mobility scenario for secondary cell (SCell) switching.

FIG. 6 is a diagram illustrating an example of a L1/L2 mobility scenario 600 for secondary cell (SCell) switching. Similar to the PCell scenario, the UE 104 may initially be served by an active PCell 610. The active PCell 610 may be in CA with SCells 620. During a L1/L2 mobility procedure, the UE 104 may determine a target candidate SCell (e.g., new SCell 620a) from a set of candidate SCells 620. For example, the set of candidate SCells 620 may include candidate SCells 620a, 620b, and 620c, which are configured as SCells in CA with the PCell 610. The target candidate SCell 620a may be selected based on, for example, L1 measurement. The L1/L2 mobility procedure may switch the candidate SCell 620a to become the new PCell. In some implementations, the old PCell 610 may become an SCell, or may no longer be used as a serving cell (e.g., due to poor channel conditions).

Figure 7:
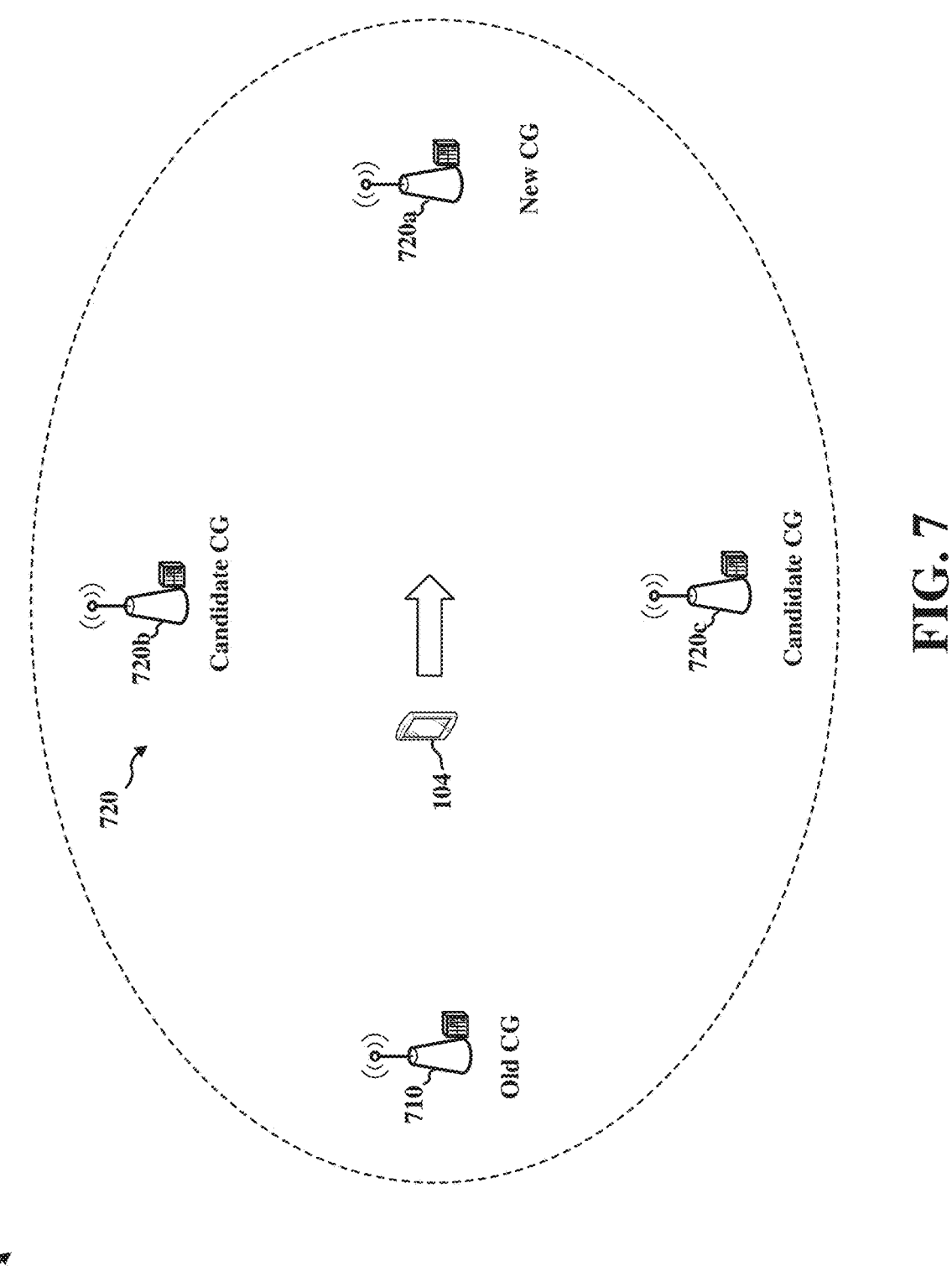
FIG. 7 is a diagram illustrating an example of a L1/L2 mobility scenario for cell groups (CGs).

FIG. 7 is a diagram illustrating an example of a L1/L2 mobility scenario 700 for cell groups (CGs). When the UE 104 is configured with cell groups, the special cell (SpCell) and the SCells may be switched as a group. For example, the current serving CG 710 may include the SpCell and SCells. The set of candidate CGs 720 may include candidate CGs 720a, 720b, and 720c. L1/L2 mobility may allow the serving CG 710 to be updated via L1/L2 signaling based on L1 measurements. The target candidate CG 720a may be selected based on, for example, L1 measurement. The L1/L2 mobility procedure may switch the candidate CG 720a to become the new serving CG.

L1/L2 mobility may include mechanisms and procedures of L1/L2 based inter-cell mobility for mobility latency reduction. For example, configuration and maintenance for multiple candidate cells may allow fast application of configurations for candidate cells 520. A dynamic switch mechanism among candidate serving cells (including PCells, SCells, and SpCells) may satisfy multiple potential applicable scenarios based on L1/L2 signaling. L1 enhancements for inter-cell beam management, including L1 measurement and reporting, and beam indication may facilitate L1/L2 mobility. Timing Advance management for candidate cells may facilitate L1/L2 mobility. CU-DU interface signaling to support L1/L2 mobility may be applicable in a distributed architecture. Example L1/L2 mobility scenarios include: Standalone, CA and NR-DC cases with serving cell change within one cell group (CG); Intra-DU case and intra-CU inter-DU case (applicable for Standalone and CA); both intra-frequency and inter-frequency mobility; both FR1 and FR2 frequency ranges; and when source and target cells are synchronized or non-synchronized.

Figure 8:
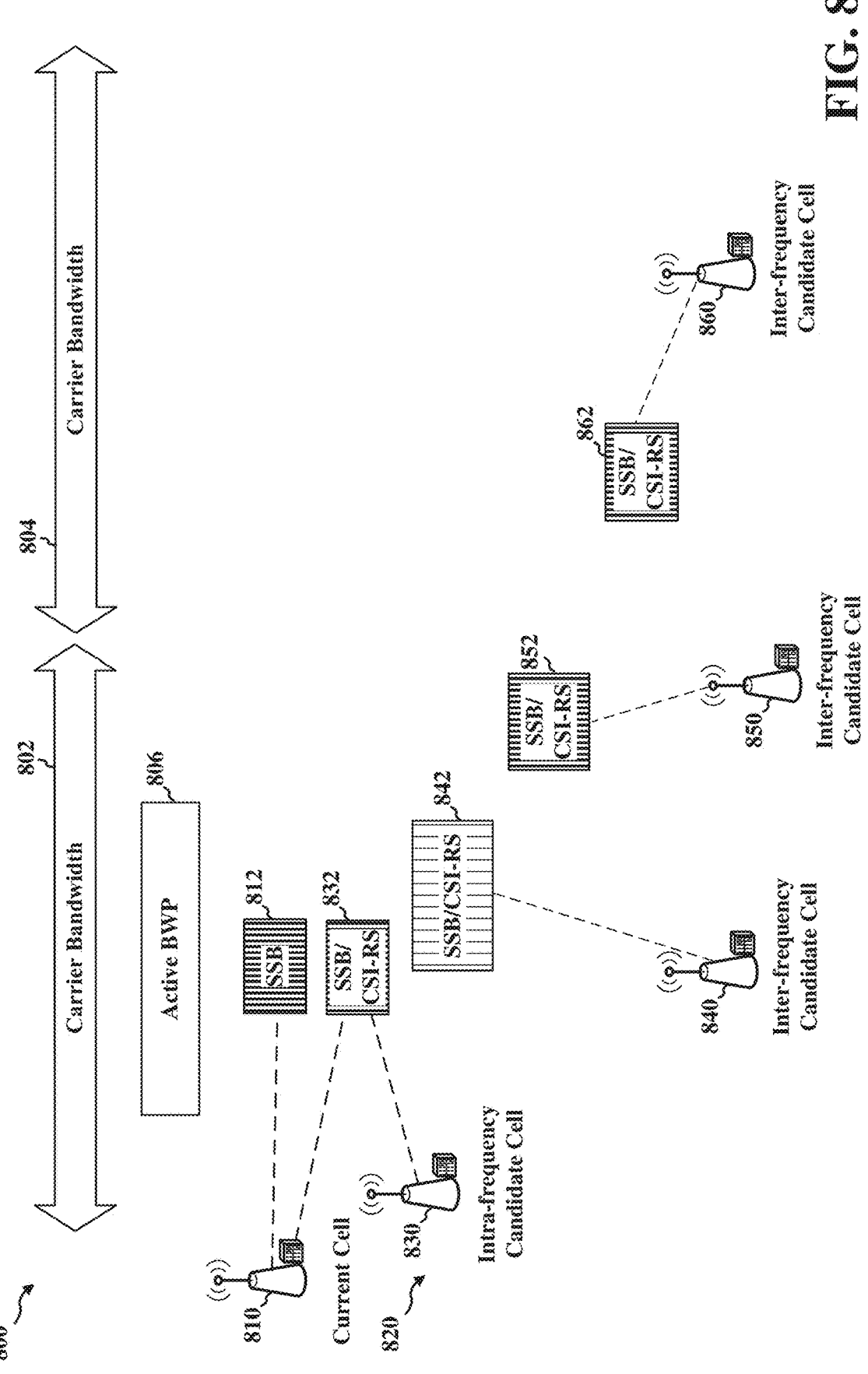
FIG. 8 is a diagram illustrating transmission of synchronization signal blocks (SSB) or channel state information (CSI) reference signal (RS) for both intra-frequency and inter-frequency measurement.

FIG. 8 is a diagram 800 illustrating transmission of synchronization signal blocks (SSB) and/or CSI-RS for both intra-frequency and inter-frequency mobility. The active serving cell 810 (e.g., PCell 510, PCell 610, or CG 710) may transmit an SSB 812 on a center frequency within a configured active bandwidth part (BWP) 806 within a carrier bandwidth 802. Various candidate cells 820 may include intra-frequency candidate cell 830, and inter-frequency candidate cells 840, 850, or 860.

An intra-frequency candidate cell 830 may be a candidate cell that operates on the same carrier bandwidth 802, active BWP 806, center frequency, and has the same subcarrier spacing (SCS) as the active serving cell 810. For example, an L3 intra-frequency measurement may be defined as an SSB based intra-frequency measurement provided the center frequency of the SSB of the serving cell indicated for measurement and the center frequency of the SSB of the neighbor cell are the same, and the subcarrier spacing of the two SSBs are also the same. For L3 measurements, it should be appreciated that the SSB need not be in the active BWP of the serving cell (e.g., the SSB can be extended to SSB/CSI-RS). With respect to inter-frequency measurements, an L3 inter-frequency may then be defined as a measurement that is not an intra-frequency measurement (e.g., where, in a candidate cell, the center frequency of the SCS of the SSB is different from that of the serving cell).

In NR release 17, only a narrow class of L1 intra-frequency measurements of a non-serving cell are allowed. For example, a UE can be configured in a serving cell configuration with a CSI-RS whose TCI is quasi-co-located with a non-serving cell SSB. The non-serving cell CSI-RS, however, is restricted to having, for example, the same scrambling seed, aligned Point A configuration, same SCS, aligned center frequency, and system frame number (SFN) offset with the serving cell. Accordingly, the configurable L1 intra-frequency measurements of NR Release 17 may not be suitable for L1/L2 mobility procedures with various types of cells.

In an aspect, a definition of an intra-frequency cell for L1 measurements may be relaxed or expanded. For example, an L1 measurement of a candidate cell may be configured in the current serving cell as non-serving cell CSI-RS must be configured in the active DL BWP, but at least some of the configuration need not follow the serving cell: For instance, the SCS and center frequency must be same as serving cell, but scrambling sequence seed may follow the scrambling sequence seed of the non-serving cell. Similarly, the Point A configuration or SFN offset may vary. As another example, the L3 definition of intra-frequency cell (e.g., same center frequency and SCS) may be applied with optional additional limitations such as a same BWP, a same SFN offset, or other BWP parameters.

A UE may perform intra-frequency measurements of candidate cells that meet the expanded definition. In some implementations, no measurement gap is needed for such intra-frequency measurements. In some implementations, however, a receive timing difference between the serving cell and a candidate cell may be greater than a cyclic prefix (CP) length according to the SCS of the candidate cell. In that case, a symbol level gap may be used to allow the UE to adjust timing to receive a complete symbol. A symbol gap may be configured before and/or after consecutive SSB/CSI RS symbols for inter-frequency measurement (e.g. in an SSB measurement timing configuration (SMTC) window). A measurement gap may be configured when the non-serving cell CSI-RS is outside of a downlink active BWP for some definitions of intra-frequency cell.

In an aspect, any cell that does not meet the definition of an intra-frequency cell may be considered an inter-frequency cell. For instance, inter-frequency cells may include the following scenarios: 1) the frequency of the measured RS not covered by any of the active BWPs of SpCell and Scells configured for a UE, but covered by some of the configured BWPs of SpCell and Scells configured for a UE;

and 2) the frequency of the measured RS not covered by any of the configured BWPs of SpCell and Scells configured for a UE. Conventionally, L1 measurements of inter-frequency cells cannot be configured.

A first type of inter-frequency candidate cell 850 may transmit an SSB or CSI-RS 852 outside of the active BWP 806 of the active serving cell 810 but within the configured carrier bandwidth 802 of the active serving cell 810.

As another example, a second type of inter-frequency candidate cell 860 may transmit an SSB or CSI-RS 862 outside of the configured carrier bandwidth 802 of the active serving cell 810 (e.g., in a carrier bandwidth 804).

As another example, a third type of inter-frequency candidate cell 840 may be a candidate cell that differs in center frequency, SCS, active BWP, or carrier bandwidth 802 from the active serving cell 810. For instance, the inter-frequency candidate cell 830 may transmit an SSB or CSI-RS 842 within an active BWP 806 of the active serving cell 810 but with a center frequency or SCS that is different than the SSB 812 of the active serving cell 810.

In an aspect, a UE 104 may be able to perform an SSB/CSI-RS based inter-frequency measurement without measurement gaps when the inter-frequency SSB/CSI-RS 842 is completely contained in the active DL BWP of the serving cell. A UE may indicate a capability to perform inter-frequency measurements without measurement gaps on inter-frequency cells 840. The capability may indicate a limit on SCS or timing difference. In an aspect, it may be assumed that a UE is configured to perform SSB/CSI based inter-frequency measurement with a measurement gap when the inter-frequency SSB/CSI 852 or 862 is outside of the active DL BWP 806 of the serving cell. Additionally, a SMTC or measurement gap may be configured if Tx timing of serving and candidate cell is not aligned (e.g., RRC flag deriveSSB-IndexFromCell is disabled). The measurement gap may be configured before and/or after consecutive SSB/CSI RS symbols for inter-frequency measurement (e.g. in the SMTC window).

Figure 9:
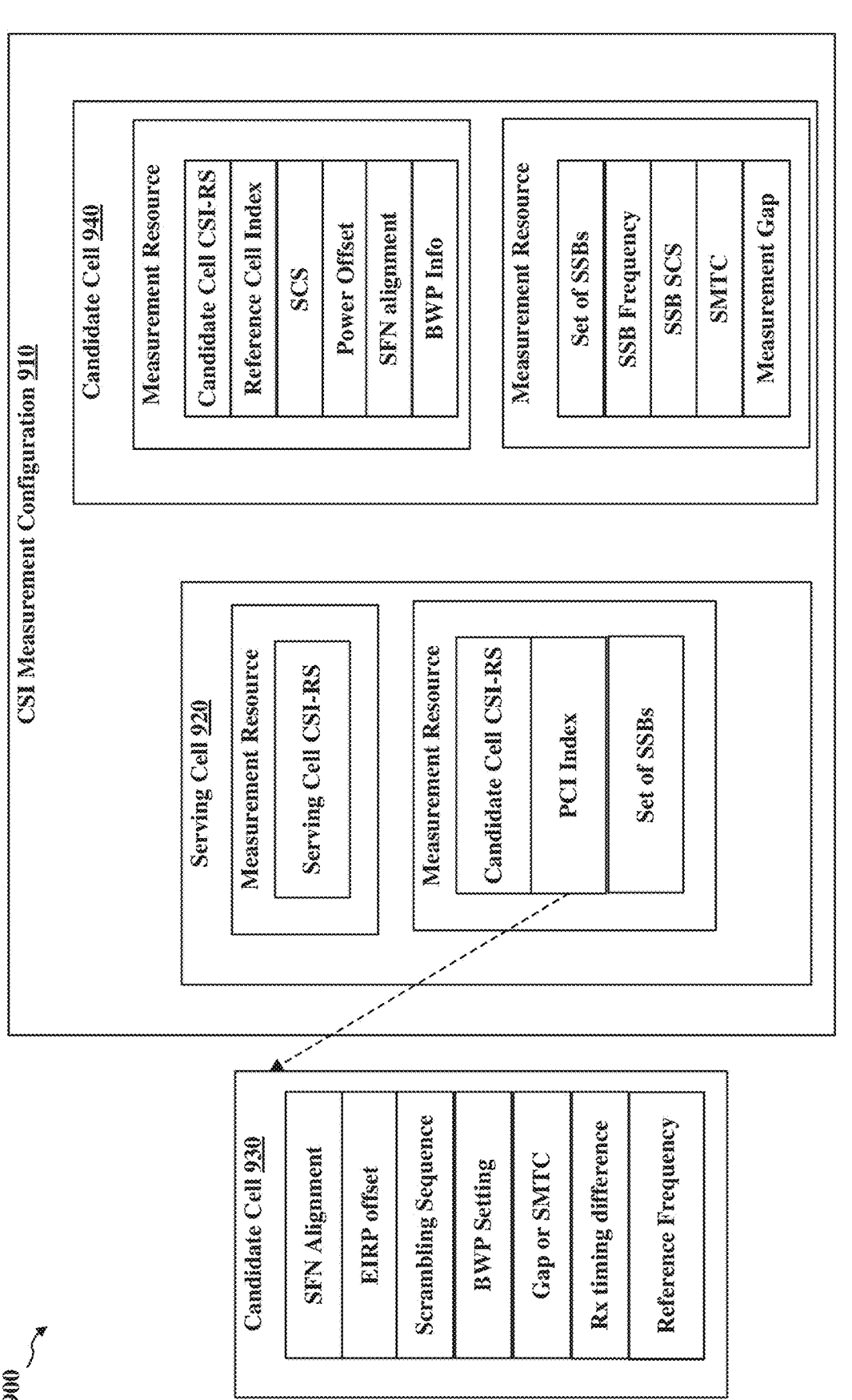
FIG. 9 is a diagram illustrating an example of a configuration message for configuring L1 measurements.

FIG. 9 is a diagram of an example RRC configuration 900 for L1 measurements of candidate cells. In an aspect, the RRC configuration 900 may include a CSI measurement configuration 910.

In some implementations, the configuration of the CSI-RS measurement resource for a candidate cell may be included within a configuration of the serving cell 920. For example, the serving cell 920 may include a measurement resource for the serving cell CSI-RS and a measurement resource for a candidate cell CSI-RS or SSB. The measurement resource for the candidate cell may include a PCI index. The PCI index may identify a separate configuration of the candidate cell 930 (e.g., a L3 measurement object). Parameters for the L1 measurement object may be defined in the separate configuration of the candidate cell 930. For example, the separate configuration of the candidate cell 930 may indicate one or more of: alignment of SFN; an effective isotropic radiated power (EIRP) offset from the current serving cell; a scrambling sequence; a BWP setting of the candidate cell; whether the candidate cell is configured with a symbol level gap or SSB measurement timing configuration (SMTC); or an assumed receive timing difference between the candidate cell and the current serving cell. In some implementations, the configuration of the candidate cell 930 may include a reference frequency CSI-RS. In some implementations, the configuration of the candidate cell 930 indicates a measurement gap configuration, a sub-carrier spacing, a power offset, an SFN alignment with the serving cell, or bandwidth part information In some implementations, the CSI measurement configuration 910 may include candidate cell configuration 940 that includes measurement resources for the candidate cell. The measurement resource may correspond to a SSB or CSI-RS for mobility. For instance, a measurement resource corresponding to an SSB may indicate a set of SSBs to be measured, an SSB frequency, an SSB sub-carrier spacing, and/or a SMTC. The measurement resource for the SSB may include a measurement gap configuration. A measurement resource corresponding to a CSI-RS may include a reference cell index identifying a reference cell for timing. The measurement resource corresponding to a CSI-RS may include one or more of: a sub-carrier spacing, a power offset, an SFN alignment with the serving cell, or bandwidth part information.

Figure 10:
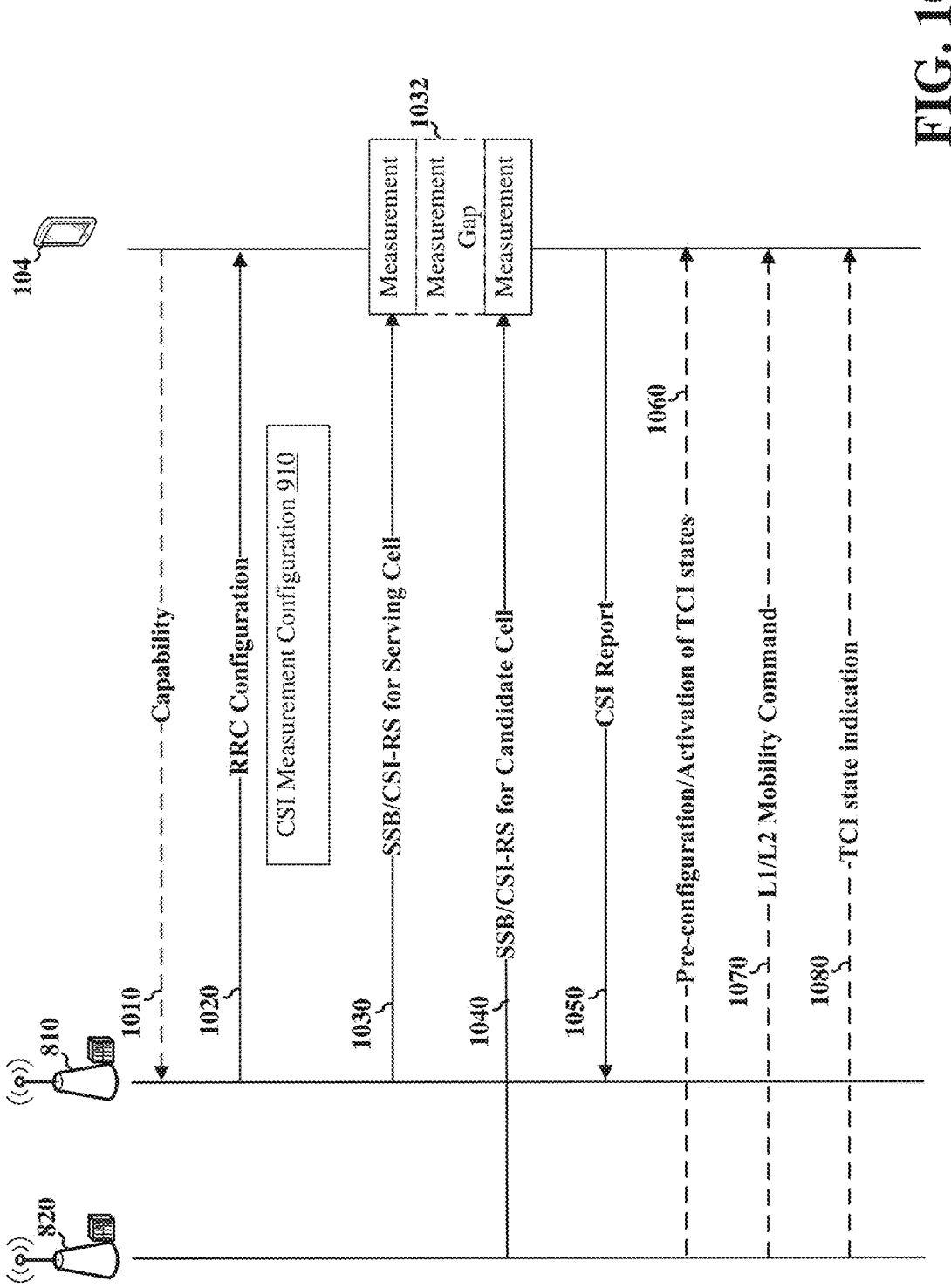
FIG. 10 is a message diagram illustrating various messages for performing L1 measurements.

FIG. 10 is a message diagram 1000 illustrating various messages for L1 measurements. The UE 104 may transmit a capability message 1010 that indicates a capability of the UE to perform L1 measurements.

The serving cell 810 may transmit an RRC configuration 1020. The RRC configuration 1020 may configure a channel CSI-RS measurement resource for L1 measurements of a candidate cell. For instance, the RRC configuration 1020 may include the CSI measurement configuration 910.

The serving cell 810 may transmit an SSB 1030 for the serving cell. For instance, the SSB/CSI-RS 1030 may correspond to the SSB 812. The UE 104 may perform L1 measurements (e.g., measure L1 reference signal received power (RSRP) or L1 signal to noise plus interference ratio (SINR) of the SSB 1030. In some implementations, a measurement gap 1032 may allow the UE 104 to adjust timing and/or frequency before a candidate cell 820 transmits an SSB/CSI-RS 1040 on a configured measurement resource. For example, the SSB/CSI-RS 1040 may correspond to any of the SSB/CSI-RS 832, 842, 852, or 862. The UE 104 may measure the SSB/CSI-RS 1040 of the candidate cell to obtain L1 measurements such as L1 RSRP or L1 SINR. In an aspect, the measurement may be based on whether the candidate cell is an intra-frequency candidate cell or an inter-frequency candidate cell. For example, the presence or length of the measurement gap 1032 may be based on the type of candidate cell.

In some implementations, the UE 104 may transmit a CSI report 1050 that includes L1 measurements of the candidate cell 820. The UE 104, the serving cell 810 and/or the candidate cell may determine whether to perform an L1/L2 mobility procedure based on the CSI report 1050.

In an example L1/L2 mobility procedure, the serving cell 810 and/or candidate cell 820 may transmit a message 1060 to preconfigure or indicate TCI states. For example, the message 1060 may include an RRC configuration and/or a MAC-CE. The serving cell 810 and/or candidate cell 820 may transmit an L1/L2 mobility command 1070 (e.g., a MAC-CE or DCI) that indicates the UE to switch to the candidate cell 820. The candidate cell 820 (now the new serving cell) may transmit a TCI state indication 1080 (e.g., a DCI) to inform the UE of a TCI state to use for communications with the new serving cell, wherein the TCI state indication 1080 may be sent before, along with, or after a cell switch command.

Figure 11:
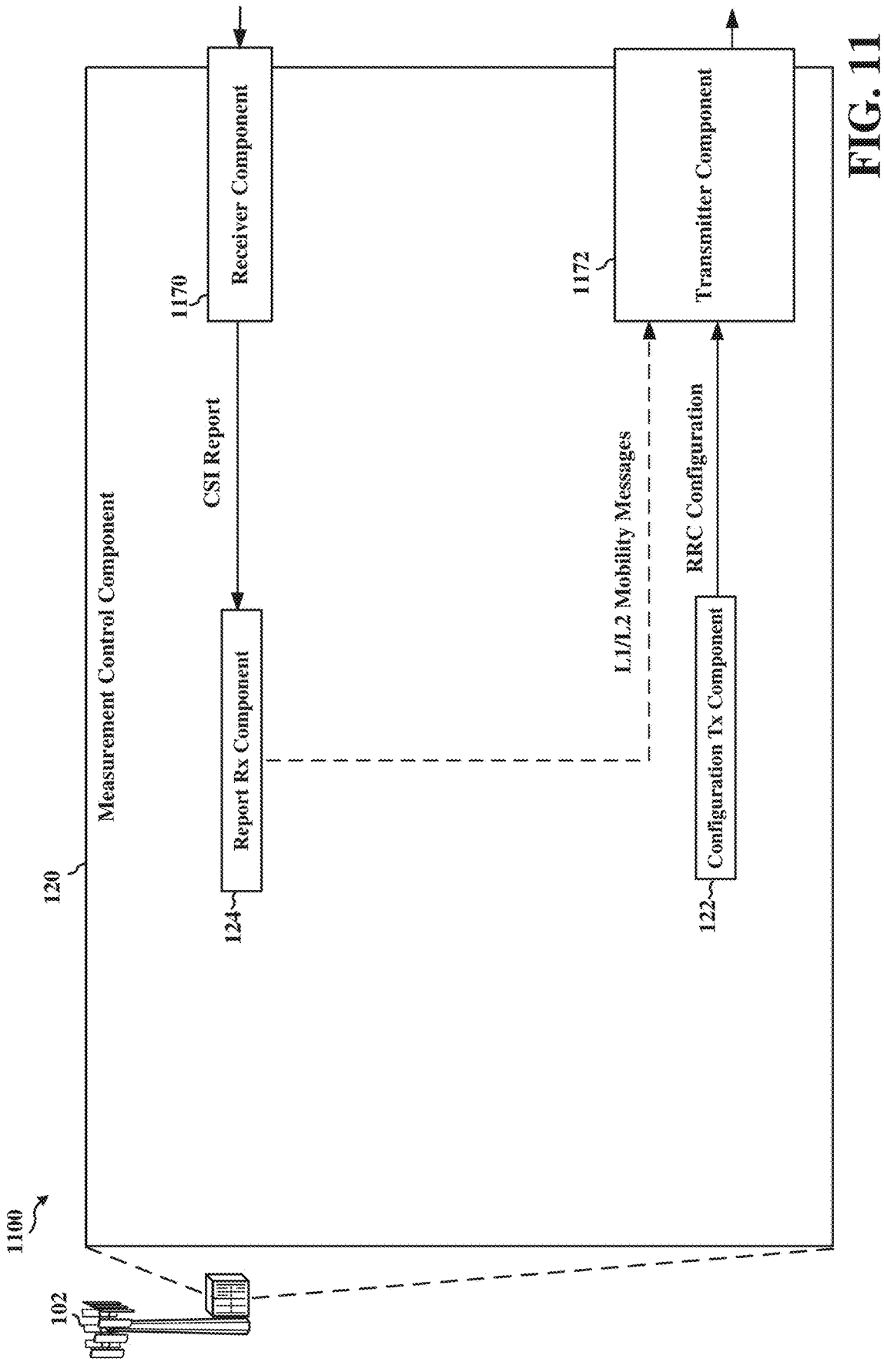
FIG. 11 is a conceptual data flow diagram illustrating the data flow between different means/components in an example BS.

FIG. 11 is a conceptual data flow diagram 1100 illustrating the data flow between different means/components in an example base station 102, which may be an example of the base station 102 (FIG. 1) including the measurement control component 120. The measurement control component 120 may be implemented by the memory 376 and the TX processor 316, the RX processor 370, and/or the controller/ processor 375 of FIG. 3. For example, the memory 376 may store executable instructions defining the measurement control component 120 and the TX processor 316, the RX processor 370, and/or the controller/processor 375 may execute the instructions.

The base station 102 may include a receiver component 1170, which may include, for example, a radio frequency (RF) receiver for receiving the signals described herein. The base station 102 may include a transmitter component 1172, which may include, for example, an RF transmitter for transmitting the signals described herein. In an aspect, the receiver component 1170 and the transmitter component 1172 may co-located in a transceiver such as illustrated by the TX/RX 318 in FIG. 3.

As discussed with respect to FIG. 1, the measurement control component 120 may include the configuration Tx component 122 and the report Rx component 124. The receiver component 1170 may receive UL signals from the UE 104 the capability message 1010 and the CSI report 1050. The receiver component 1170 may provide the capability message 1010 to the configuration Tx component 122. The receiver component 1170 may provide the CSI report 1050 to the report Rx component 124. message to the report Rx component 124.

The configuration Tx component 122 may be configured to transmit, from a current serving cell, a configuration of a CSI-RS measurement resource for L1 measurements of a candidate cell. In some implementations, the configuration Tx component 122 may obtain the capability message 1010. The configuration Tx component 122 may determine that the UE 104 is capable of L1 measurements based on the capability message 1010. The configuration Tx component 122 may receive information about candidate cells from the core network 190 (e.g., AMF 192). The configuration Tx component 122 may select candidate cells for the UE 104 and generate an RRC configuration 1020 identifying L1 measurement resources corresponding to the candidate cells. The configuration is based on whether the candidate cell is an intra-frequency candidate cell or an inter-frequency candidate cell. For example, the configuration Tx component 122 may generate the CSI measurement configuration 910. The parameters for each measurement resource may be based on the type of the candidate cell. The configuration Tx component 122 may output the RRC configuration 1020 for transmission to the UE 104 via the transmitter component 1172.

The report Rx component 124 may be configured to receive a L1 CSI report 1050 including measurements of the candidate cell. For example, the measurement control component 120 may obtain the L1 CSI report 1050 via the receiver component 1170. In some implementations, the report Rx component 124 may evaluate the L1 measurements. For example, the report Rx component 124 determine whether an L1/L2 mobility condition is satisfied by the L1 measurements. In some implementations, the report Rx component 124 may output L1/L2 mobility messages such as the message 1060, the mobility command 1070, or the TCI state indication 1080 for transmission to the UE 104 via the transmitter component 1172.

Figure 12:
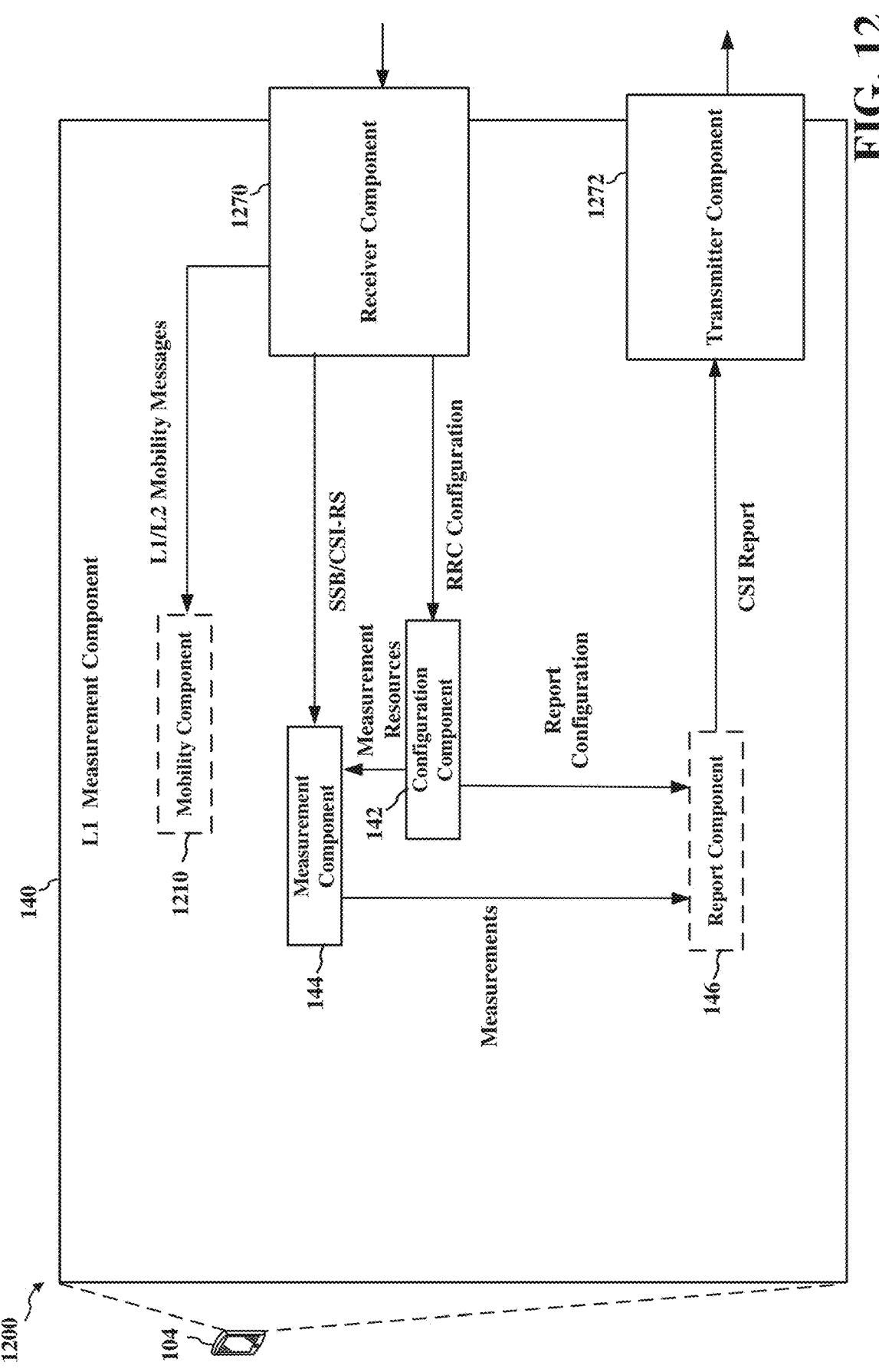
FIG. 12 is a conceptual data flow diagram illustrating the data flow between different means/components in an example UE.

FIG. 12 is a conceptual data flow diagram 1200 illustrating the data flow between different means/components in an example UE 104, which may be an example of the UE 104 (FIG. 1) and include the L1 measurement component 140. The L1 measurement component 140 may be implemented by the memory 360 and the TX processor 368, the RX processor 356, and/or the controller/processor 359. For example, the memory 360 may store executable instructions defining the L1 measurement component 140 and the TX processor 368, the RX processor 356, and/or the controller/processor 359 may execute the instructions.

The UE 104 may include a receiver component 1270, which may include, for example, a RF receiver for receiving the signals described herein. The UE 104 may include a transmitter component 1272, which may include, for example, an RF transmitter for transmitting the signals described herein. In an aspect, the receiver component 1270 and the transmitter component 1272 may co-located in a transceiver such as the TX/RX 352 in FIG. 3.

As discussed with respect to FIG. 1, the L1 measurement component 140 may include the configuration component 142 and the measurement component 144. In some implementations, the L1 measurement component 140 may include the reporting component 146 and/or a mobility component 1210.

The receiver component 1270 may receive DL signals described herein such as the RRC configuration 1020, the SSB/CSI-RS 1030, the SSB/CSI-RS 1040, the message 1060, the mobility command 1070, or the TCI state indication 1080. The receiver component 1270 may provide the RRC configuration 1020 to the configuration component 142. The receiver component 1270 provide the SSB/CSI-RS 1030 and/or the SSB/CSI-RS 1040 to the measurement component 144. The receiver component 1270 may provide the message 1060, the mobility command 1070, or the TCI state indication 1080 to the mobility component 1210.

The configuration component 142 may be configured to receive, from a current serving cell, a configuration of a CSI-RS measurement resource for L1 measurements of a candidate cell. For example, the configuration component 142 may receive the RRC configuration 1020 via the receiver component 1270. The configuration component 142 may determine the CSI-RS measurement resource for L1 measurements of the candidate cell based on the information elements of the RRC configuration 1020. The configuration component 142 may output the measurement resources to the measurement component 144. The configuration component 142 may output a report configuration to the reporting component 146.

The measurement component 144 may be configured to measure a signal transmitted from the candidate cell based on whether the candidate cell is an intra-frequency candidate cell or an inter-frequency candidate cell. For example, the measurement component 144 may receive the SSB/CSI-RS 1030, 1040 via the receiver component 1270. In some implementations, the measurement component 144 may tune the receiver component 1270 to a correct frequency to receive an inter-frequency SSB/CSI-RS. In some implementations, the measurement component 144 may adjust a timing for receiving an SSB/CSI-RS. The measurement component 144 may determine measurements such as L1 RSRP or L1 SINR based on the received SSB/CSI-RS. The measurement component 144 may output the measurements to the reporting component 146 and/or the mobility component 1210.

The reporting component 146 may be configured to transmit a L1 CSI report 1050 including measurements of the candidate cell. For example, the reporting component 146 may obtain a report configuration from the configuration component 142. The reporting component 146 may obtain the measurements from the measurement component 144. The reporting component 146 may include the configured measurements in the CSI report 1050. The reporting component 146 may output the CSI report 1050 for transmission via the transmitter component 1272.

The mobility component 1210 may be configured to perform an L1/L2 mobility procedure. The mobility component 1210 may receive mobility messages via the receiver component 1270. For example, the mobility component 1210 may receive the message 1060, the mobility command 1070, and/or the TCI state indication 1080. The mobility component 1210 may configure the UE 104 as indicated in the L1/L2 mobility messages.

Figure 13:
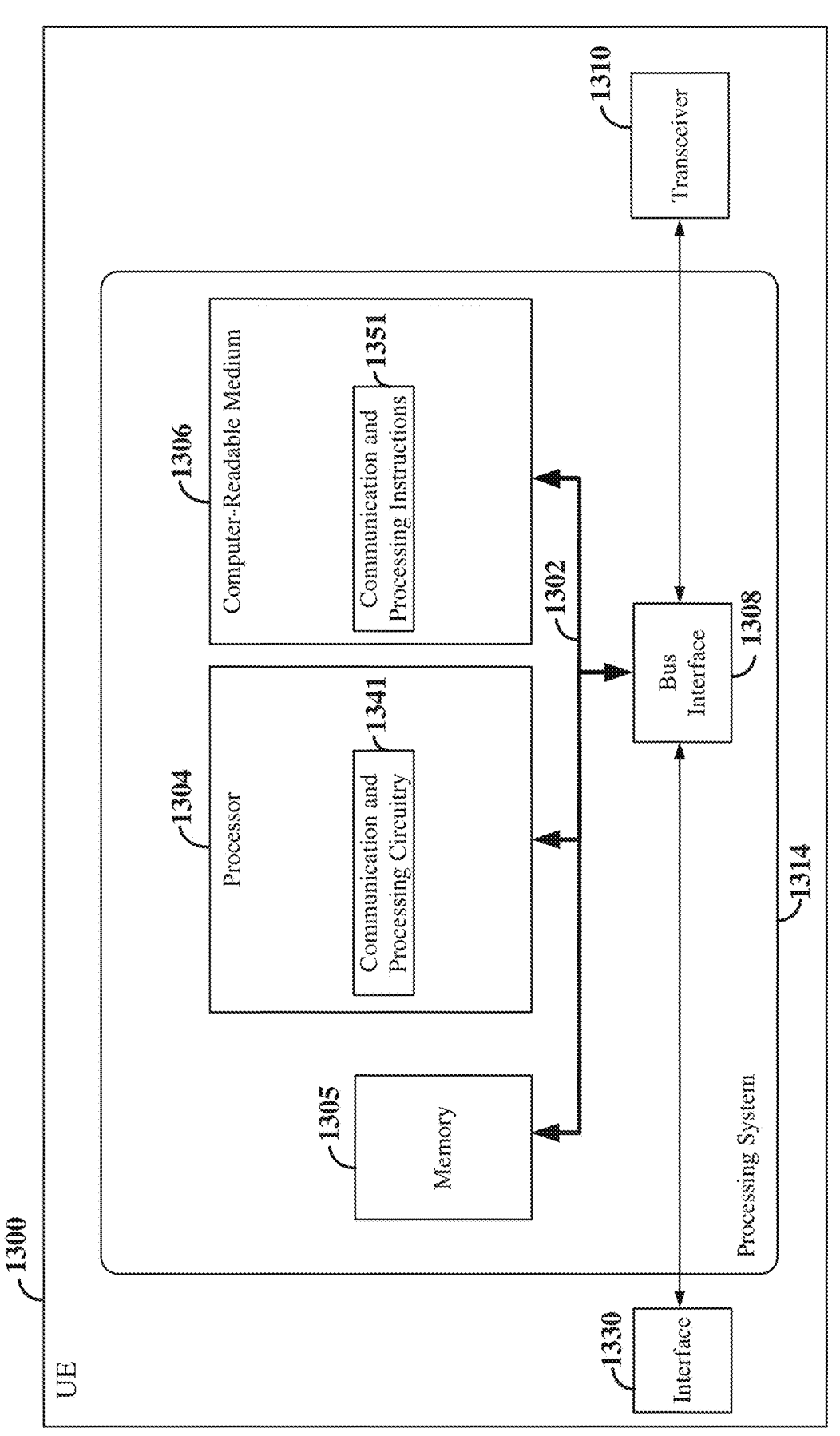
FIG. 13 is a block diagram illustrating an example of a hardware implementation for a user equipment (UE) employing a processing system according to some aspects.

FIG. 13 is a block diagram conceptually illustrating an example of a hardware implementation for a user equipment (UE) 1300 employing a processing system 1314 according to some aspects of the disclosure. In accordance with various aspects of the disclosure, an element, or any portion of an element, or any combination of elements may be implemented with a processing system 1314 that includes one or more processors 1304. In some implementations, the UE 1300 may correspond to any of the UEs or scheduled entities shown in any of the FIGS. included herein.

The UE 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described below.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and between the bus 1302 and an interface 1330. The transceiver 1310 provides a communication interface or means for communicating with various other apparatus over a wireless transmission medium. In some examples, the wireless communication device may include two or more transceivers 1310, each configured to communicate with a respective network type (e.g., terrestrial or non-terrestrial). At least one interface 1330 (e.g., a network interface and/or a user interface) provides a communication interface or means of communicating with various other apparatus and devices (e.g., other devices housed within the same apparatus as the UE 1300 or an external apparatus) over an internal bus or via external transmission medium, such as an Ethernet cable.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1300 may be configured to perform any one or more of the operations described herein (e.g., as described above in conjunction with FIGS. 1-12 and as described below in conjunction with FIGS. 14 and 15). In some aspects of the disclosure, the processor 1304, as utilized in the UE 1300, may include circuitry configured for various functions.

In one aspect, the processor 1304 may include a communication and processing circuitry 1341. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains. The communication and processing circuitry 1341 may further be configured to execute communication and processing instructions 1351 included on the computer-readable medium 1306 to implement one or more functions described herein.

In a particular configuration of UE 1300, processor 1304 may, in conjunction with communication and processing circuitry 1341 and/or the transceiver 1310, detect a first reference signal and a second reference signal in which the first reference signal has overlapping resources with the second reference signal, and where at least one of the first reference signal or the second reference signal is from a non-serving cell. In this configuration, processor 1304 may further, in conjunction with communication and processing circuitry 1341 and/or the transceiver 1310, determine a context associated with at least one of the first reference signal or the second reference signal, and perform a Layer 1 (L1) measurement of at least one of the first reference signal or the second reference signal in accordance with a prioritization associated with the context.

In further aspects of this particular configuration, it is contemplated that the prioritization associated with the context may be based on any of various parameters. For instance, the prioritization may be based on whether the L1 measurement is an inter-frequency measurement or an intra-frequency measurement, and/or based on whether the overlapping resources have a same subcarrier spacing (SCS). In another aspect, the prioritization is based on a UE capability corresponding to how many of the overlapping resources the UE can measure at a time, and/or based on a UE capability corresponding to reference signals from how many cells the UE can measure at a time.

Various other parameters from which the prioritization may be based are also contemplated. For instance, the prioritization may be based on a frequency band from which the first reference signal and the second reference signal are detected. The prioritization may also be based on a corresponding type of reference signal associated with the first reference signal and the second reference signal (e.g., a CSI-RS or an SSB), and/or based on a type of L1 measurement to be performed (e.g., an L1 SINR measurement, wherein the prioritization is based on whether at least one of the first reference signal or the second reference signal is an interference measurement reference signal).

In another example, the prioritization may be based on a purpose of the overlapping resources. For instance, it is contemplated that the purpose of the overlapping resources may be one of radio link monitoring (RLM), beam failure detection (BFD), candidate beam detection (CBD), Layer 1 Reference Signal Received Power (L1-RSRP) measurement, or Layer 1 signal to interference and noise ratio (L1-SINR) measurement.

In yet another example, the prioritization may be based on a physical cell identifier (PCI) associated with at least one of the first reference signal or the second reference signal. For instance, it is contemplated that the prioritization may be based on whether the PCI is a serving cell PCI or a non-serving cell PCI.

Various examples of inter-frequency and intra-frequency measurement restrictions that may be implemented by UE 1300 are provided herein. For instance, a first set of examples is contemplated for when a CSI-RS is configured for L1-RSRP measurements.

In a first example of this first set, for both FR1 and FR2, when the CSI-RS for an L1-RSRP measurement is in the same OFDM symbol as the SSB for an RLM, BFD, CBD or L1-RSRP measurement, UE 1300 may not be required to receive a CSI-RS for an L1-RSRP measurement in the PRBs that overlap with the SSB.

In a second example of this first set, for FR1, when the SSB for an RLM, BFD, CBD or L1-RSRP measurement is within the active BWP and has the same SCS as the CSI-RS for the L1-RSRP measurement, the UE 1300 may be allowed to perform a CSI-RS measurement without restrictions.

In a third example of this first set, for FR1, when the SSB for an RLM, BFD, CBD or L1-RSRP measurement is within the active BWP and has a different SCS than the CSI-RS for an L1-RSRP measurement, the UE 1300 may be allowed to perform a CSI-RS measurement with restrictions in accordance with the capabilities of UE 1300. For instance, in a particular configuration, if UE 1300 supports "simultaneousRxDataSSB-DiffNumerology", UE 1300 may be allowed to perform CSI-RS measurements without restrictions. However, if UE 1300 does not support "simultaneousRxDataSSB-DiffNumerology", UE 1300 may be required to measure one of but not both the CSI-RS for an L1-RSRP measurement and an SSB (wherein a longer measurement period for a CSI-RS-based L1-RSRP measurement may result).

In a fourth example of this first set, for FR1, when the CSI-RS for an L1-RSRP measurement is in the same OFDM symbol as another CSI-RS for an RLM, BFD, CBD or L1-RSRP measurement, UE 1300 may be allowed to measure the CSI-RS for an L1-RSRP measurement without any restriction.

In a fifth example of this first set, for FR2, when the CSI-RS for an L1-RSRP measurement on one CC is in the same OFDM symbol as an SSB for an RLM, BFD or L1-RSRP measurement on the same CC or different CCs in the same band, or in the same symbol as an SSB for a CBD measurement on the same CC or different CCs in the same band when a beam failure is detected, UE 1300 may be required to measure one of but not both the CSI-RS for an L1-RSRP measurement and an SSB (wherein a longer measurement period for a CSI-RS-based L1-RSRP measurement may result).

In a sixth example of this first set, for FR2, when the CSI-RS for an L1-RSRP measurement on one CC is in the same OFDM symbol as another CSI-RS for an RLM, BFD, CBD or L1-RSRP measurement on the same CC or different CCs in the same band, UE 1300 may be required to measure one, but not both, of the CSI-RS for an L1-RSRP measurement and the other CSI-RS (wherein a longer measurement period for a CSI-RS-based L1-RSRP measurement may result) for the following cases: 1) the CSI-RS for an L1-RSRP measurement or the other CSI-RS in a resource set is configured with repetition ON; 2) the other CSI-RS is configured in q1 and a beam failure is detected; or 3) the two CSI-RSs are not QCLed with respect to QCL-TypeD, or the QCL information is not known to UE 1300. Otherwise, UE 1300 may be allowed to measure the CSI-RS for an L1-RSRP measurement without any restriction.

A second set of exemplary implementations is contemplated for when a CSI-RS is configured for L1-SINR measurements.

In a first example of this second set, for both FR1 and FR2, when the CSI-RS configured for an L1-SINR measurement is in the same OFDM symbol as the SSB for an RLM, BFD, CBD, L1-RSRP or L1-SINR measurement, UE 1300 may not be required to receive a CSI-RS for an L1-SINR measurement in the PRBs that overlap with the SSB. In a second example of this second set, for FR1, when the SSB for an RLM, BFD, CBD, L1-RSRP or L1-SINR measurement is within the active BWP and has the same SCS as the CSI-RS configured for an L1-SINR measurement, UE 1300 may be allowed to perform a CSI-RS measurement without restrictions.

In a third example of this second set, for FR1, when SSB for an RLM, BFD, CBD, L1-RSRP or L1-SINR measurement is within the active BWP and has a different SCS than the CSI-RS configured for an L1-SINR measurement, the UE 1300 may be allowed to perform a CSI-RS measurement with restrictions in accordance with the capabilities of UE 1300. For instance, in a particular configuration, if UE 1300 supports "simultaneousRxDataSSB-DiffNumerology", UE 1300 may be allowed to perform CSI-RS measurements without restrictions. However, if UE 1300 does not support "simultaneousRxDataSSB-DiffNumerology", UE 1300 may be required to measure one of but not both the CSI-RS for an L1-SINR measurement and an SSB (wherein a longer measurement period for a CSI-RS-based L1-SINR measurement may result).

In a fourth example of this second set, for FR1, when the CSI-RS configured for an L1-SINR measurement is in the same OFDM symbol as another CSI-RS for an RLM, BFD, CBD, L1-RSRP, or L1-SINR measurement, UE 1300 may be allowed to measure the CSI-RS for an L1-SINR measurement without any restriction.

In a fifth example of this second set, for FR2, when the CSI-RS configured for an L1-SINR measurement on one CC is in the same OFDM symbol as an SSB for an RLM, BFD, L1-RSRP or L1-SINR measurement on the same CC or different CCs in the same band, or in the same symbol as an SSB for a CBD measurement on the same CC or different CCs in the same band when a beam failure is detected, UE 1300 may be required to measure one of but not both the CSI-RS for an L1-SINR measurement and an SSB (wherein a longer measurement period for a CSI-RS-based L1-SINR measurement may result).

In a sixth example of this second set, for FR2, when the CSI-RS configured for an L1-SINR measurement on one CC is in the same OFDM symbol as another CSI-RS for an RLM, BFD, CBD, L1-RSRP or L1-SINR measurement on the same CC or different CCs in the same band, UE 1300 may be required to measure one, but not both, of the CSI-RS for an L1-SINR measurement and the other CSI-RS (wherein a longer measurement period for a CSI-RS-based L1-SINR measurement may result) for the following cases: 1) the CSI-RS for an L1-SINR measurement or the other CSI-RS in a resource set is configured with repetition ON; 2) the CSI-RS or the other CSI-RS is configured as a dedicated interference management resource (IMR) for an L1-SINR computation with an SSB as a channel measurement resource (CMR); 3) the other CSI-RS is configured in q1 and a beam failure is detected; or 4) the two CSI-RS s are not QCLed with respect to QCL-TypeD, or the QCL information is not known to UE 1300. Otherwise, UE 1300 may be allowed to measure the CSI-RS for an L1-SINR measurement without any restriction.

A third set of exemplary implementations is contemplated for when a CSI interference management (CSI-IM) resource is configured for L1-SINR measurements.

In a first example of this third set, for both FR1 and FR2, when the CSI-IM resource configured for an L1-SINR measurement is in the same OFDM symbol as an SSB for an RLM, BFD, CBD, L1-RSRP or L1-SINR measurement, UE 1300 may not be required to measure a CSI-IM resource for an L1-SINR measurement in the PRBs that overlap with an SSB.

In a second example of this third set, for FR1, UE 1300 may be allowed to measure the CSI-IM resource configured for an L1-SINR measurement without any restriction.

In a third example of this third set, for FR2, when the CSI-IM resource configured for L1-SINR measurement on one CC is in the same OFDM symbol as an SSB for an RLM, BFD, L1-RSRP or L1-SINR measurement on the same CC or different CCs in the same band, or in the same symbol as SSB for CBD measurement on the same CC or different CCs in the same band when a beam failure is detected, UE 1300 may be required to measure one of but not both the CSI-IM resource for an L1-SINR measurement and an SSB (wherein a longer measurement period for an L1-SINR measurement may result).

In a fourth example of this third set, for FR2, when the CSI-IM resource configured for L1-SINR measurement on one CC is in the same OFDM symbol as the CSI-RS for an RLM, BFD, CBD, L1-RSRP or L1-SINR measurement on the same CC or different CCs in the same band, UE 1300 may be required to measure one, but not both, of the CSI-IM resource for an L1-SINR measurement and a CSI-RS (wherein a longer measurement period for an L1-SINR measurement may result) for the following cases: 1) the CSI-RS in a resource set is configured with repetition ON; 2) the CSI-IM resource or the CSI-RS is configured as a dedicated IMR for an L1-SINR computation with an SSB as a CMR; 3) the CSI-RS is configured in q1 and a beam failure is detected; or 4) the CMR for an L1-SINR measurement and the CSI-RS are not QCLed with respect to QCL-TypeD, or the QCL information is not known to UE 1300. Otherwise, UE 1300 may be allowed to measure the CSI-IM resource configured for an L1-SINR measurement without any restriction.

In another configuration of UE 1300, processor 1304 may, in conjunction with communication and processing circuitry 1341 and/or the transceiver 1310, communicate with a gNodeB (gNb) using one or more transmission configuration indication (TCI) states, wherein each of the one or more TCI states is associated with a corresponding control resource set (CORESET) pool of one or more CORESETs, and wherein each CORESET pool corresponds to a transmission reception point (TRP). In this configuration, processor 1304 may further, in conjunction with communication and processing circuitry 1341 and/or the transceiver 1310, identify one or more sets of beam failure detection (BFD) reference signals (e.g., where the one or more sets of BFD reference signals are source reference signals associated with the one or more TCI states), wherein the one or more sets of BFD reference signals are identified either explicitly via a configuration signaling from the gNb or implicitly based on the one or more TCI states in an absence of the configuration signaling. Processor 1304 may also, in conjunction with communication and processing circuitry 1341 and/or the transceiver 1310, monitor the one or more sets of BFD reference signals to facilitate detecting a beam failure event.

Various aspects for this particular configuration are contemplated. For instance, it is contemplated that processor 1304 may be configured to identify a single set of BFD reference signals based on an indication signaling received from the gNb corresponding to a single TCI state. Processor 1304 may then be further configured to associate the single set of BFD reference signals with every TRP of a cell.

In another aspect, processor 1304 may be configured to identify a plurality of sets of BFD reference signals based on an indication signaling received from the gNb corresponding to a plurality of TCI states. Processor 1304 may then be further configured to associate the plurality of sets of BFD reference signals with a corresponding plurality of TRPs of a cell. For instance, processor 1304 may be configured to detect the beam failure event at a TRP level, and/or at a cell level.

In a further aspect, processor 1304 may be configured to identify a plurality of sets of BFD reference signals based on an indication signaling received from the gNb corresponding to a single TCI state. For instance, processor 1304 may be configured to implicitly select multiple sets of BFD reference signals based on the single TCI state and a previously indicated TCI state.

In another example, it is contemplated that processor 1304 may be configured to identify a plurality of sets of BFD reference signals when the UE has not received an indication signaling of a TCI state. For this example, processor 1304 may be further configured to: identify the plurality of sets of BFD reference signals based on an activated TCI codepoint that includes a plurality of TCI states; select a TCI codepoint having a lowest identifier among all TCI codepoints with two or more TCI states; and identify BFD reference signals to monitor using the two or more TCI states included in the selected TCI codepoint.

In a further aspect, processor 1304 may be configured to receive a scheduling command of a communication assignment via a particular CORESET pool. For this example, processor 1304 may be further configured to select a TCI state associated with the particular CORESET pool for the communication assignment from the one or more TCI states. Here, it should be appreciated that the communication assignment may be any of various types including, for example, a type corresponding to one of a semi-persistent/aperiodic (SP/AP) channel state information reference signal (CSI-RS) for a tracking reference signal, a channel state feedback, a beam management, an SP/AP sounding reference signal (SRS) for antenna switching, a codebook based transmission, a non-codebook based transmission, a physical downlink control channel (PDCCH) order based physical random access channel (PRACH), SP/AP physical uplink shared channel (PUSCH), or SP/AP physical uplink control channel (PUCCH).

Referring next to FIG. 14, a flow chart is provided illustrating a first exemplary wireless communication method 1400 implemented by a UE according to some aspects of the disclosure. As described herein, some or all illustrated features may be omitted in a particular implementation within the scope of the present disclosure, and some illustrated features may not be required for implementation of all examples. In some examples, the method 1400 may be carried out by the UE 1300 illustrated in FIG. 13. In some examples, the method 1400 may be carried out by any suitable apparatus or means for carrying out the functions or algorithm described below.

At block 1402, the UE 1300 may detect a first reference signal and a second reference signal in which the first reference signal has overlapping resources with the second reference signal, and where at least one of the first reference signal or the second reference signal is from a non-serving cell. In an aspect, the processes of block 1402 may be implemented by a means for detecting reference signals, which may be implemented by processor 1304, communication and processing circuitry 1341, and/or transceiver 1310, in a particular aspect, or equivalents thereof.

Further, at block 1404 the UE 1300 may determine a context associated with at least one of the first reference signal or the second reference signal. In an aspect, the processes of block 1404 may be implemented by a means for determining a context, which may be implemented by processor 1304 and/or communication and processing circuitry 1341, in particular aspects, or equivalents thereof.

Method 1400 concludes at block 1406 where the UE 1300 may perform an L1 measurement of at least one of the first reference signal or the second reference signal in accordance with a prioritization associated with the context. In an aspect, the processes of block 1406 may be implemented by a means for performing L1 measurements of reference signals, which may be implemented by processor 1304 and/or communication and processing circuitry 1341, in particular aspects, or equivalents thereof.

Referring next to FIG. 15, a flow chart is provided illustrating a second exemplary wireless communication method 1500 implemented by a UE according to some aspects of the disclosure. As described herein, some or all illustrated features may be omitted in a particular implementation within the scope of the present disclosure, and some illustrated features may not be required for implementation of all examples. In some examples, the method 1500 may be carried out by the UE 1300 illustrated in FIG. 13. In some examples, the method 1500 may be carried out by any suitable apparatus or means for carrying out the functions or algorithm described below.

At block 1502, the UE 1300 may communicate with a gNb using one or more TCI states, where each of the one or more TCI states is associated with a corresponding CORESET pool of one or more CORESETs, and where each CORESET pool corresponds to a TRP. In an aspect, the processes of block 1502 may be implemented by a means for communicating with a gNb, which may be implemented by processor 1304, communication and processing circuitry 1341, and/or transceiver 1310, in a particular aspect, or equivalents thereof.

Further at block 1504 the UE 1300 may identify one or more sets of BFD reference signals in which the one or more sets of BFD reference signals are identified either explicitly via a configuration signaling from the gNb or implicitly based on the one or more TCI states in an absence of the configuration signaling. In an aspect, the processes of block 1504 may be implemented by a means for identifying sets of BFD reference signals, which may be implemented by processor 1304 and/or communication and processing circuitry 1341, in particular aspects, or equivalents thereof.

Method 1500 concludes at block 1506 where the UE 1300 may monitor the one or more sets of BFD reference signals to facilitate detecting a beam failure event. In an aspect, the processes of block 1506 may be implemented by a means for monitoring BFD reference signals, which may be implemented by processor 1304 and/or communication and processing circuitry 1341, in particular aspects, or equivalents thereof.

Figure 16:
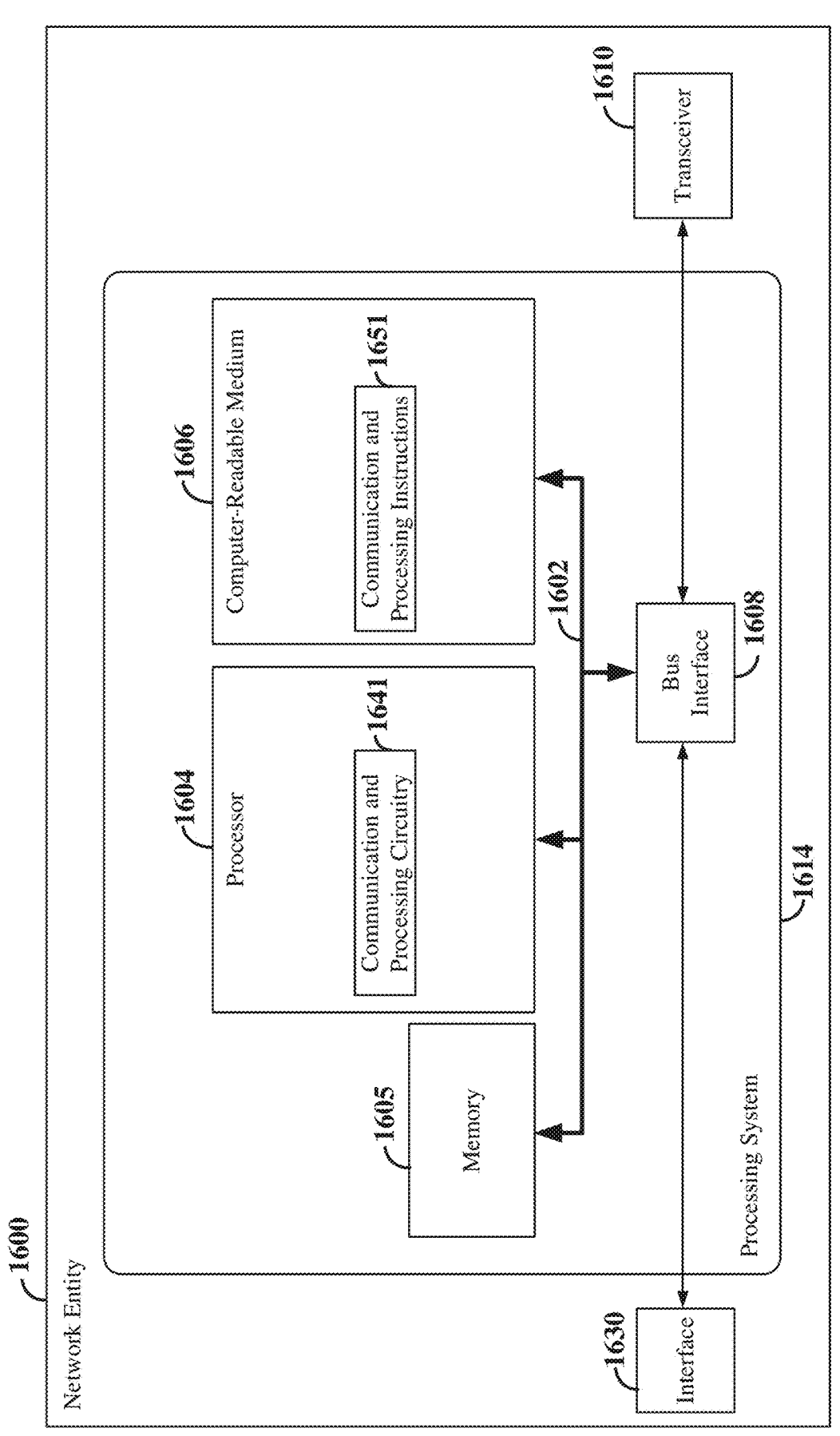
FIG. 16 is a block diagram illustrating an example of a hardware implementation for a network entity such as a base station employing a processing system according to some aspects.

FIG. 16 is a block diagram conceptually illustrating an example of a hardware implementation for a network node or entity 1600 employing a processing system 1614 according to some aspects of the disclosure. In accordance with various aspects of the disclosure, an element, or any portion of an element, or any combination of elements may be implemented with a processing system 1614 that includes one or more processors 1604. In some implementations, the network entity 1600 may correspond to any of the BSs (e.g., gNBs, eNBs, etc.) or scheduling entities shown in any of the FIGS. included herein. In further aspects, the network entity 1600 may be configured as a base station operable within an Open RAN (O-RAN) environment, wherein the base station (e.g., 1600) is disaggregated and includes distinct parts including a distributed unit (DU), a centralized unit (CU), and a radio unit (RU). In yet further aspects, the disclosed and illustrated processing portions of network entity 1600 may be implemented within the RU, DU and/or the CU or within portions of each. In addition, the network entity 1600 may be a stationary network entity or a mobile network entity.

The network entity 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 1600 may be configured to perform any one or more of the functions described herein. That is, the processor 1604, as utilized in network entity 1600, may be used to implement any one or more of the processes and procedures described herein.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610 and between the bus 1602 and an interface 1630. The transceiver 1610 provides a communication interface or means for communicating with various other apparatus over a wireless transmission medium. In some examples, the wireless communication device may include two or more transceivers 1610, each configured to communicate with a respective network type (e.g., terrestrial or non-terrestrial). At least one interface 1630 (e.g., a network interface and/or a user interface) provides a communication interface or means of communicating with various other apparatus and devices (e.g., other devices housed within the same apparatus as the network entity 1600 or an external apparatus) over an internal bus or external transmission medium, such as an Ethernet cable.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The network entity 1600 may be configured to perform any one or more of the operations described herein (e.g., as described above in conjunction with FIGS. 1-12 and as described below in conjunction with FIG. 17). In some aspects of the disclosure, the processor 1604, as utilized in the network entity 1600, may include circuitry configured for various functions.

The processor 1604 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from multiple UEs.

The processor 1604 may be configured to schedule resources for the transmission of downlink reference signals (e.g., SSBs or CSI-RS s) or DCI (or SRS triggering) on a plurality of downlink beams for a downlink beam sweep in accordance with a selected downlink beam sweep type and selected number of downlink reference signal resources indicated in a request for uplink beam refinement received from a UE. The processor 1604 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1604 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 1604 may be configured to schedule PUSCH resources for the uplink beam refinement request in response to receiving a scheduling request from the UE.

The processor 1604 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

The processor 1604 may include communication and processing circuitry 1641. The communication and processing circuitry 1641 may include one or more hardware components that provide the physical structure that performs various processes related to wireless communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. In some examples, the communication and processing circuitry 1641 may include two or more transmit/receive chains. In another example, the communication and processing circuitry 1641 may be configured to communicate higher layer information such as RRC configuration information to a UE. The communication and processing circuitry 1641 may further be configured to execute communication and processing software 1651 included on the computer-readable medium 1606 to implement one or more functions described herein.

In a particular configuration of network entity 1600, processor 1604 may, in conjunction with communication and processing circuitry 1641 and/or the transceiver 1610, determine a scheduling associated with a configuration of resources, where the configuration of resources enables a UE (e.g., UE 1300) to prioritize performing an L1 measurement of a reference signal from a non-serving cell. In this configuration, processor 1604 may further, in conjunction with communication and processing circuitry 1641 and/or the transceiver 1610, communicate with the UE in accordance with the scheduling.

Various scheduling restriction aspects for this particular configuration are contemplated. For instance, it is contemplated that the scheduling may restrict the UE from transmitting a set of communications during the L1 measurement (e.g., where the set of communications includes at least one of a PUCCH communication, a PUSCH communication, or an SRS), and/or that the scheduling may restrict the UE from receiving a set of communications related to a channel quality indicator (CQI) calculation during the L1 measurement (e.g., where the set of communications includes at least one of a PDCCH communication, a PDSCH communication, a TRS, or a CSI-RS).

In another aspect, it is contemplated that the scheduling may restrict a window of time between successive reference signals during which the L1 measurement may be performed, wherein the window of time is K1 symbols before a subsequent reference signal and K2 symbols after a prior reference signal. Here, it is further contemplated that K1 and K2 may be calculated in any of various ways. For instance, processor 1604 may be configured to calculate K1 and K2 based on a tone spacing between data and at least one of a first reference signal from a serving cell or a second reference signal from the non-serving cell. Processor 1604 may also be configured to calculate K1 and K2 based on a time difference between receiving a first reference signal from a serving cell and a second reference signal from the non-serving cell. In another aspect, processor 1604 is configured to calculate K1 and K2 based on an alignment between a transmission time of a first reference signal from a serving cell and a transmission time of a second reference signal from the non-serving cell. In yet another aspect, processor 1604 is configured to calculate K1 and K2 based on whether the L1 measurement is an inter-frequency measurement or an intra-frequency measurement.

Various examples of scheduling restrictions that may be implemented by network entity 1600 are provided herein. For instance, a first set of exemplary scheduling restrictions is contemplated for L1-RSRP measurements.

In a first example of this first set, a scheduling restriction for L1-RSRP measurements is contemplated due to L1-SINR measurements. Here, there are no scheduling restrictions due to L1-SINR measurements performed based on the CSI-RS for the following cases: 1) where CSI-RS is only used for an L1-SINR measurement of a CSI-RS-based CMR; 2) where CSI-RS is used for an L1-SINR measurement of a CSI-RS-based CMR plus a CSI-RS-based ZP-IMR/NZP-IMR; and 3) where CSI-RS is used for an L1-SINR measurement of a CSI-RS-based CMR plus ZP-IMR, where CSI-RS is QCLed with an active TCI state for PDCCH/PDSCH and not in a CSI-RS resource set with repetition ON. Otherwise, for all other cases: 1) for UEs that support FR2 power class 6, which are not configured with [highSpeedMeasFlagFR2-r17], and for UEs that do not support FR2 power class 6, the UE is not expected to transmit PUCCH/PUSCH/SRS or receive PDCCH/PDSCH/CSI-RS for tracking/CSI-RS for CQI on the CSI-RS for L1-RSRP measurement symbols to be measured for L1-SINR; and 2) for UEs that support FR2 power class 6 and are configured with [highSpeedMeasFlagFR2-r17], the UE is not expected to transmit PUCCH/PUSCH/SRS or receive PDCCH/PDSCH/CSI-RS for tracking/CSI-RS for CQI on the symbols to be measured for L1-SINR, as well as on one data symbol before symbols to be measured for L1-SINR, and one data symbol after symbols to be measured for L1-SINR. Here, it should be appreciated that, when intra-band carrier aggregation is performed, the scheduling restrictions on a serving cell where an L1-SINR measurement is performed may apply to all serving cells in the band on the symbols that fully or partially overlap with restricted symbols.

In a second example of this first set, a scheduling restriction is contemplated if the following conditions are met: 1) the UE has been notified about a system information update through paging; and 2) the gap between the UE's reception of PDCCH that the UE monitors in the Type 2-PDCCH CSS set (and that provides the system information update), and the PDCCH that the UE monitors in the Type0-PDCCH CSS set, is greater than two slots. Under these conditions, for the SSB and CORESET for RMSI scheduling multiplexing patterns 3, the UE may be expected to receive the PDCCH that the UE monitors in the Type0-PDCCH CSS set, and the corresponding PDSCH, on SSB symbols to be measured for an L1-SINR measurement. Also, under these conditions, for the SSB and CORESET for RMSI scheduling multiplexing patterns 2, the UE may be expected to receive a PDSCH that corresponds to the PDCCH that the UE monitors in the Type0-PDCCH CSS set, on SSB symbols to be measured for an L1-SINR measurement.

A second set of exemplary implementations is contemplated for L1-SINR measurements. For instance, a first example of this second set is contemplated for FR1, wherein no scheduling restriction is implemented due to having L1-SINR measurements performed on an SSB, and the CSI-RS configured for L1-SINR measurements with the same SCS as PDSCH/PDCCH in FR1.

In a second example of this second set, an implementation is contemplated for FR2. For this example, there are no scheduling restrictions due to L1-SINR measurements performed based on the CSI-RS for the following cases: 1) where CSI-RS is only used for an L1-SINR measurement of a CSI-RS-based CMR; 2) where CSI-RS is used for an L1-SINR measurement of a CSI-RS-based CMR plus a CSI-RS-based ZP-IMR/NZP-IMR; and 3) where CSI-RS is used for an L1-SINR measurement of a CSI-RS-based CMR plus ZP-IMR, where CSI-RS is QCLed with an active TCI state for PDCCH/PDSCH and not in a CSI-RS resource set with repetition ON. Otherwise, for all other cases: 1) for UEs that support FR2 power class 6, which are not configured with [highSpeedMeasFlagFR2-r17], and for UEs that do not support FR2 power class 6, the UE may not be expected to transmit PUCCH/PUSCH/SRS or receive PDCCH/PDSCH/CSI-RS for tracking/CSI-RS for CQI on the CSI-RS for L1-RSRP measurement symbols to be measured for L1-SINR; and 2) for UEs that support FR2 power class 6 and are configured with [highSpeedMeasFlagFR2-r17], the UE may not be expected to transmit PUCCH/PUSCH/SRS or receive PDCCH/PDSCH/CSI-RS for tracking/CSI-RS for CQI on the symbols to be measured for L1-SINR, as well as on one data symbol before symbols to be measured for L1-SINR, and one data symbol after symbols to be measured for L1-SINR. Here, it should be appreciated that, when intra-band carrier aggregation is performed, the scheduling restrictions on a serving cell where an L1-SINR measurement is performed may apply to all serving cells in the band on the symbols that fully or partially overlap with restricted symbols.

In a third example of this second set, a scheduling restriction is contemplated if the following conditions are met: 1) the UE has been notified about a system information update through paging; and 2) the gap between the UE's reception of PDCCH that the UE monitors in the Type 2-PDCCH CSS set (and that provides the system information update), and the PDCCH that the UE monitors in the Type0-PDCCH CSS set, is greater than two slots. Under these conditions, for the SSB and CORESET for RMSI scheduling multiplexing patterns 3, the UE may be expected to receive the PDCCH that the UE monitors in the Type0-PDCCH CSS set, and the corresponding PDSCH, on SSB symbols to be measured for an L1-SINR measurement. Also, under these conditions, for the SSB and CORESET for RMSI scheduling multiplexing patterns 2, the UE may be expected to receive a PDSCH that corresponds to the PDCCH that the UE monitors in the Type0-PDCCH CSS set, on SSB symbols to be measured for an L1-SINR measurement.

Figure 17:
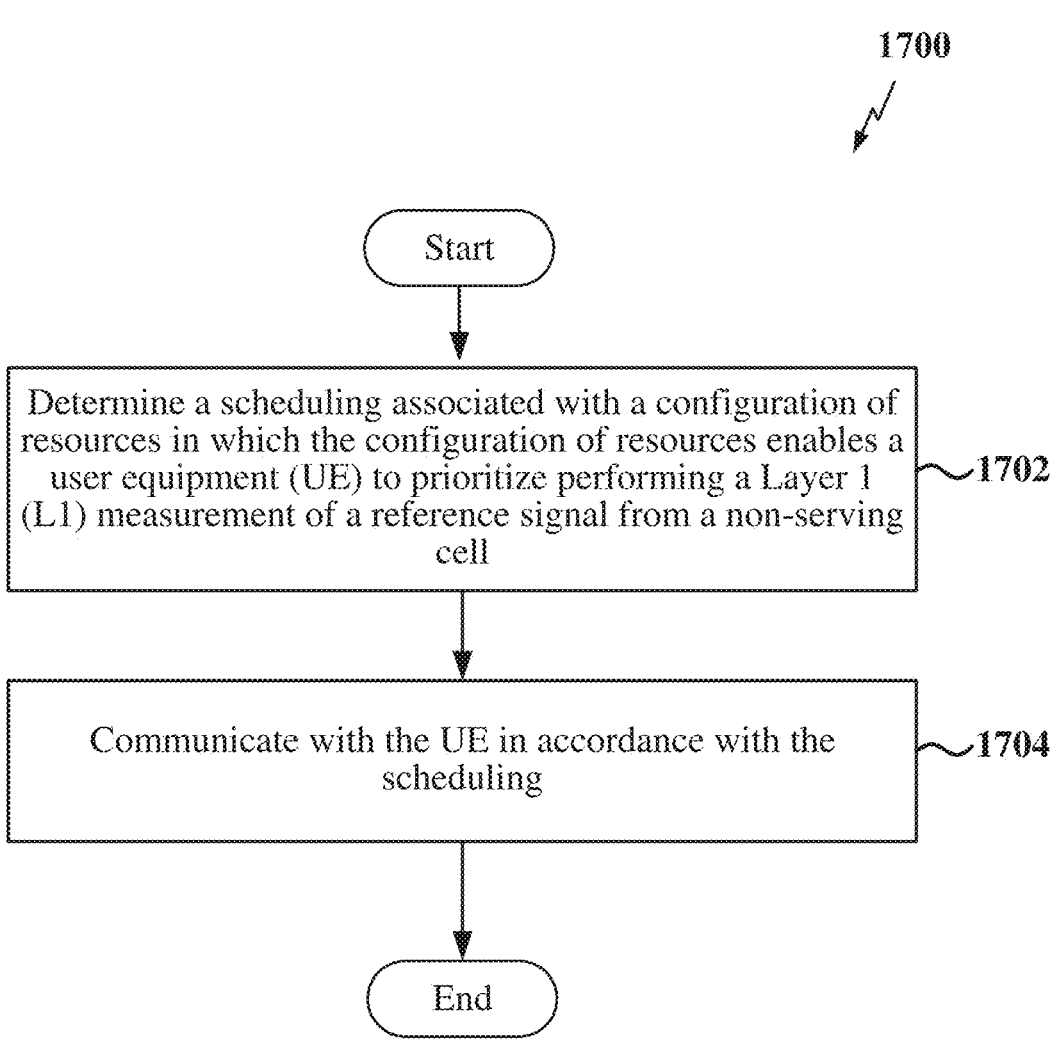
FIG. 17 is a flow chart illustrating a method for communication in a network entity according to some aspects.

Referring next to FIG. 17, a flow chart is provided illustrating an exemplary wireless communication method 1700 according to some aspects of the disclosure. As described herein, some or all illustrated features may be omitted in a particular implementation within the scope of the present disclosure, and some illustrated features may not be required for implementation of all examples. In some examples, the method 1700 may be carried out by the network entity 1600 (e.g., a gNB or base station including a base station operable in an O-RAN environment) illustrated in FIG. 16. In some examples, the method 1700 may be carried out by any suitable apparatus or means for carrying out the functions or algorithm described below.

At block 1702, the network entity 1600 may determine a scheduling associated with a configuration of resources in which the configuration of resources enables a UE to prioritize performing an L1 measurement of a reference signal from a non-serving cell. In an aspect, the processes of block 1702 may be implemented by a means for determining a scheduling, which may be implemented by processor 1604 and communication and processing circuitry 1641, in a particular aspect, or equivalents thereof.

Additionally, at block 1704, the network entity 1600 may communicate with the UE in accordance with the scheduling. In an aspect, the processes of block 1704 may be implemented by a means for communicating with a UE, which may be implemented by processor 1604, communication and processing circuitry 1641, and transceiver 1610, in a particular aspect, or equivalents thereof.

Of further note, the present disclosure may include the following further aspects of the present disclosure.

Aspect 1: A UE, comprising a transceiver, a memory, and a processor coupled to the transceiver and the memory, wherein the processor is configured to: detect a first reference signal and a second reference signal, wherein the first reference signal has overlapping resources with the second reference signal, and wherein at least one of the first reference signal or the second reference signal is from a non-serving cell; determine a context associated with at least one of the first reference signal or the second reference signal; and perform an L1 measurement of at least one of the first reference signal or the second reference signal in accordance with a prioritization associated with the context.

Aspect 2: The UE of aspect 1, wherein the prioritization associated with the context is based on whether the L1 measurement is an inter-frequency measurement or an intra-frequency measurement.

Aspect 3: The UE of aspect 1 or 2, wherein the prioritization associated with the context is based on whether the overlapping resources have a same SCS.

Aspect 4: The UE of any of aspects 1 through 3, wherein the prioritization associated with the context is based on a UE capability corresponding to how many of the overlapping resources the UE can measure at a time.

Aspect 5: The UE of any of aspects 1 through 4, wherein the prioritization associated with the context is based on a UE capability corresponding to reference signals from how many cells the UE can measure at a time.

Aspect 6: The UE of any of aspects 1 through 5, wherein the prioritization associated with the context is based on a frequency band from which the first reference signal and the second reference signal are detected.

Aspect 7: The UE of any of aspects 1 through 6, wherein the prioritization associated with the context is based on a corresponding type of reference signal associated with the first reference signal and the second reference signal.

Aspect 8: The UE of any of aspects 1 through 7, wherein the prioritization associated with the context is based on a type of L1 measurement to be performed.

Aspect 9: The UE of any of aspects 1 through 8, wherein the prioritization associated with the context is based on a purpose of the overlapping resources.

Aspect 10: The UE of any of aspects 1 through 9, wherein the prioritization associated with the context is based on a PCI associated with at least one of the first reference signal or the second reference signal.

Aspect 11: A method of wireless communications in a UE comprising: detecting a first reference signal and a second reference signal, wherein the first reference signal has overlapping resources with the second reference signal, and wherein at least one of the first reference signal or the second reference signal is from a non-serving cell; determining a context associated with at least one of the first reference signal or the second reference signal; and performing an L1 measurement of at least one of the first reference signal or the second reference signal in accordance with a prioritization associated with the context.

Aspect 12: A network entity configured for wireless communication comprising a memory and a processor coupled to the memory, the processor being configured to: determine a scheduling associated with a configuration of resources, wherein the configuration of resources enables a UE to prioritize performing an L1 measurement of a reference signal from a non-serving cell; and communicate with the UE in accordance with the scheduling.

Aspect 13: The network entity of aspect 12, wherein the scheduling restricts the UE from transmitting a set of communications during the L1 measurement.

Aspect 14: The network entity of any of aspects 12 through 13, wherein the scheduling restricts the UE from receiving a set of communications related to a CQI calculation during the L1 measurement.

Aspect 15: The network entity of any of aspects 12 through 14, wherein the scheduling restricts a window of time between successive reference signals during which the L1 measurement may be performed, and wherein the window of time is K1 symbols before a subsequent reference signal and K2 symbols after a prior reference signal.

Aspect 16: The network entity of any of aspects 12 through 15, wherein the processor is configured to calculate K1 and K2 based on a tone spacing between data and at least one of a first reference signal from a serving cell or a second reference signal from the non-serving cell.

Aspect 17: The network entity of any of aspects 12 through 16, wherein the processor is configured to calculate K1 and K2 based on a time difference between receiving a first reference signal from a serving cell and a second reference signal from the non-serving cell.

Aspect 18: The network entity of any of aspects 12 through 17, wherein the processor is configured to calculate K1 and K2 based on an alignment between a transmission time of a first reference signal from a serving cell and a transmission time of a second reference signal from the non-serving cell.

Aspect 19: The network entity of any of aspects 12 through 18, wherein the processor is configured to calculate K1 and K2 based on whether the L1 measurement is an inter-frequency measurement or an intra-frequency measurement.

Aspect 20: A UE, comprising a transceiver, a memory, and a processor coupled to the transceiver and the memory, wherein the processor is configured to: communicate with a gNb using one or more TCI states, wherein each of the one or more TCI states is associated with a corresponding CORESET pool of one or more CORESETs, and wherein each CORESET pool corresponds to a TRP; identify one or more sets of BFD reference signals, wherein the one or more sets of BFD reference signals are identified either explicitly via a configuration signaling from the gNb or implicitly based on the one or more TCI states in an absence of the configuration signaling; and monitor the one or more sets of BFD reference signals to facilitate detecting a beam failure event.

Aspect 21: The UE of aspect 20, wherein the processor is configured to identify a single set of BFD reference signals based on an indication signaling received from the gNb corresponding to a single TCI state, and wherein the processor is further configured to associate the single set of BFD reference signals with every TRP of a cell.

Aspect 22: The UE of aspect 20 or 21, wherein the processor is configured to identify a plurality of sets of BFD reference signals based on an indication signaling received from the gNb corresponding to a plurality of TCI states, and wherein the processor is further configured to associate the plurality of sets of BFD reference signals with a corresponding plurality of TRPs of a cell.

Aspect 23: The UE of aspect 22, wherein the processor is configured to detect the beam failure event at a TRP level.

Aspect 24: The UE of aspect 22, wherein the processor is configured to detect the beam failure event at a cell level.

Aspect 25: The UE of any of aspects 20 through 24, wherein the processor is configured to identify a plurality of sets of BFD reference signals based on an indication signaling received from the gNb corresponding to a single TCI state, and wherein the processor is further configured to implicitly select multiple sets of BFD reference signals based on the single TCI state and a previously indicated TCI state.

Aspect 26: The UE of any of aspects 20 through 25, wherein the processor is configured to identify a plurality of sets of BFD reference signals when the UE has not received an indication signaling of a TCI state.

Aspect 27: The UE of any of aspects 20 through 26, wherein the processor is configured to: identify a plurality of sets of BFD reference signals based on an activated TCI codepoint that includes a plurality of TCI states; select a TCI codepoint having a lowest identifier among all TCI codepoints with two or more TCI states; and identify BFD reference signals to monitor using the two or more TCI states included in the selected TCI codepoint.

Aspect 28: The UE of any of aspects 20 through 27, wherein the one or more sets of BFD reference signals are source reference signals associated with the one or more TCI states.

Aspect 29: The UE of any of aspects 20 through 28, wherein the processor is configured to receive a scheduling command of a communication assignment via a particular CORESET pool, and wherein the processor is further configured to select a TCI state associated with the particular CORESET pool for the communication assignment from the one or more TCI states.

Aspect 30: The UE of aspect 29, wherein the communication assignment is a type corresponding to one of a SP/AP CSI-RS for a tracking reference signal, a channel state feedback, a beam management, an SP/AP SRS for antenna switching, a codebook based transmission, a non-codebook based transmission, a PDCCH order based PRACH, an SP/AP PUSCH, or SP/AP PUCCH.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) standards IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:

a transceiver;

a memory; and a processor coupled to the transceiver and the memory, wherein the processor is configured to:

communicate with a gNodeB (gNb) using one or more transmission configuration indication (TCI) states, wherein each of the one or more TCI states is associated with a corresponding control resource set (CORESET) pool of one or more CORESETs, and wherein each CORESET pool corresponds to a transmission reception point (TRP);

determine whether a configuration signaling associated with one or more sets of beam failure detection (BFD) reference signals from the gNb is present;

identify the one or more sets of the BFD reference signals explicitly via the configuration signaling from the gNb in response to determining a presence of the configuration signaling;

identify the one or more sets of BFD reference signals implicitly based on the one or more TCI states in response to determining an absence of the configuration signaling;

monitor the one or more sets of BFD reference signals to facilitate detecting a beam failure event;

receive a scheduling command of a communication assignment via a particular CORESET pool; and select a TCI state associated with the particular CORE-SET pool for the communication assignment from the one or more TCI states.

2. The UE of claim 1, wherein the processor is configured to identify a single set of BFD reference signals based on an indication signaling received from the gNb corresponding to a single TCI state, and wherein the processor is further configured to associate the single set of BFD reference signals with every TRP of a cell.

3. The UE of claim 1, wherein the processor is configured to identify a plurality of sets of BFD reference signals based on an indication signaling received from the gNb corresponding to a plurality of TCI states, and wherein the processor is further configured to associate the plurality of sets of BFD reference signals with a corresponding plurality of TRPs of a cell.

4. The UE of claim 3, wherein the processor is configured to detect the beam failure event at a TRP level.

5. The UE of claim 3, wherein the processor is configured to detect the beam failure event at a cell level.

6. The UE of claim 1, wherein the processor is configured to identify a plurality of sets of BFD reference signals based on an indication signaling received from the gNb corresponding to a single TCI state, and wherein the processor is further configured to implicitly select multiple sets of BFD reference signals based on the single TCI state and a previously indicated TCI state.

7. The UE of claim 1, wherein the processor is configured to identify a plurality of sets of BFD reference signals when the UE has not received an indication signaling of a TCI state.

8. The UE of claim 1, wherein the processor is configured to:

identify a plurality of sets of BFD reference signals based on an activated TCI codepoint that includes a plurality of TCI states;

select a TCI codepoint having a lowest identifier among all TCI codepoints with two or more TCI states; and identify BFD reference signals to monitor using the two or more TCI states included in the selected TCI codepoint.

9. The UE of claim 1, wherein the one or more sets of BFD reference signals are source reference signals associated with the one or more TCI states.

10. The UE of claim 1, wherein the communication assignment is a type corresponding to one of a semi-persistent/aperiodic (SP/AP) channel state information reference signal (CSI-RS) for a tracking reference signal, a channel state feedback, a beam management, an SP/AP sounding reference signal (SRS) for antenna switching, a codebook based transmission, a non-codebook based transmission, a physical downlink control channel (PDCCH) order based physical random access channel (PRACH), SP/AP physical uplink shared channel (PUSCH), or SP/AP physical uplink control channel (PUCCH).

11. A method of wireless communication performed by a user equipment (UE), comprising:

communicating with a gNodeB (gNb) using one or more transmission configuration indication (TCI) states, wherein each of the one or more TCI states is associated with a corresponding control resource set (CORESET) pool of one or more CORESETs, and wherein each CORESET pool corresponds to a transmission reception point (TRP);

determining whether a configuration signaling associated with one or more sets of beam failure detection (BFD) reference signals from the gNb is present;

identifying the one or more sets of the BFD reference signals explicitly via the configuration signaling from the gNb in response to determining a presence of the configuration signaling;

identifying the one or more sets of BFD reference signals implicitly based on the one or more TCI states in response to determining an absence of the configuration signaling;

monitoring the one or more sets of BFD reference signals to facilitate detecting a beam failure event;

receiving a scheduling command of a communication assignment via a particular CORESET pool; and selecting a TCI state associated with the particular CORE-SET pool for the communication assignment from the one or more TCI states.

12. The method of claim 11, further comprising:

identifying a single set of BFD reference signals based on an indication signaling received from the gNb corresponding to a single TCI state;

associating the single set of BFD reference signals with every TRP of a cell.

13. The method of claim 11, further comprising:

identifying a plurality of sets of BFD reference signals based on an indication signaling received from the gNb corresponding to a plurality of TCI states; and associating the plurality of sets of BFD reference signals with a corresponding plurality of TRPs of a cell.

14. The method of claim 13, further comprising:

detecting the beam failure event at a TRP level.

15. The method of claim 13, further comprising:

detecting the beam failure event at a cell level.

16. The method of claim 11, further comprising:

identifying a plurality of sets of BFD reference signals based on an indication signaling received from the gNb corresponding to a single TCI state; and implicitly selecting multiple sets of BFD reference signals based on the single TCI state and a previously indicated TCI state.

17. The method of claim 11, further comprising:

identifying a plurality of sets of BFD reference signals when the UE has not received an indication signaling of a TCI state.

18. The method of claim 11, further comprising:

identifying a plurality of sets of BFD reference signals based on an activated TCI codepoint that includes a plurality of TCI states;

selecting a TCI codepoint having a lowest identifier among all TCI codepoints with two or more TCI states; and identifying BFD reference signals to monitor using the two or more TCI states included in the selected TCI codepoint.

19. The method of claim 11, wherein the one or more sets of BFD reference signals are source reference signals associated with the one or more TCI states.

20. The method of claim 11, wherein the communication assignment is a type corresponding to one of a semi-persistent/aperiodic (SP/AP) channel state information reference signal (CSI-RS) for a tracking reference signal, a channel state feedback, a beam management, an SP/AP sounding reference signal (SRS) for antenna switching, a codebook based transmission, a non-codebook based transmission, a physical downlink control channel (PDCCH) order based physical random access channel (PRACH), SP/AP physical uplink shared channel (PUSCH), or SP/AP physical uplink control channel (PUCCH).

21. A user equipment (UE), comprising:

means for communicating with a gNodeB (gNb) using one or more transmission configuration indication (TCI) states, wherein each of the one or more TCI states is associated with a corresponding control resource set (CORESET) pool of one or more CORESETs, and wherein each CORESET pool corresponds to a transmission reception point (TRP);

means for determining whether a configuration signaling associated with one or more sets of beam failure detection (BFD) reference signals from the gNb is present;

means for identifying the one or more sets of the BFD reference signals explicitly via the configuration signaling from the gNb in response to determining a presence of the configuration signaling;

means for identifying the one or more sets of BFD reference signals implicitly based on the one or more TCI states in response to determining an absence of the configuration signaling;

means for monitoring the one or more sets of BFD reference signals to facilitate detecting a beam failure event;

means for receiving a scheduling command of a communication assignment via a particular CORESET pool; and means for selecting a TCI state associated with the particular CORESET pool for the communication assignment from the one or more TCI states.

22. The UE of claim 21, further comprising:

means for identifying a single set of BFD reference signals based on an indication signaling received from the gNb corresponding to a single TCI state;

means for associating the single set of BFD reference signals with every TRP of a cell.

23. The UE of claim 21, further comprising:

means for identifying a plurality of sets of BFD reference signals based on an indication signaling received from the gNb corresponding to a plurality of TCI states; and means for associating the plurality of sets of BFD reference signals with a corresponding plurality of TRPs of a cell.

24. The UE of claim 23, further comprising:

means for detecting the beam failure event at a TRP level.

25. The UE of claim 23, further comprising:

means for detecting the beam failure event at a cell level.

26. The UE of claim 21, further comprising:

means for identifying a plurality of sets of BFD reference signals based on an indication signaling received from the gNb corresponding to a single TCI state; and means for implicitly selecting multiple sets of BFD reference signals based on the single TCI state and a previously indicated TCI state.

27. The UE of claim 21, further comprising:

means for identifying a plurality of sets of BFD reference signals when the UE has not received an indication signaling of a TCI state.

28. The UE of claim 21, further comprising:

means for identifying a plurality of sets of BFD reference signals based on an activated TCI codepoint that includes a plurality of TCI states;

means for selecting a TCI codepoint having a lowest identifier among all TCI codepoints with two or more TCI states; and means for identifying BFD reference signals to monitor using the two or more TCI states included in the selected TCI codepoint.

* * * * *